(12) United States Patent
Baker et al.

(10) Patent No.: US 6,579,341 B2
(45) Date of Patent: Jun. 17, 2003

(54) NITROGEN GAS SEPARATION USING ORGANIC-VAPOR-RESISTANT MEMBRANES

(75) Inventors: Richard W. Baker, Palo Alto, CA (US); Ingo Pinnau, Palo Alto, CA (US); Zhenjie He, Fremont, CA (US); Karl D. Amo, Mountain View, CA (US); Andre R. Da Costa, Menlo Park, CA (US); Ramin Daniels, San Jose, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 0 days.

(21) Appl. No.: 10/100,459

(22) Filed: Mar. 18, 2002

(65) Prior Publication Data

US 2002/0170430 A1 Nov. 21, 2002

Related U.S. Application Data

(63) Continuation-in-part of application No. 09/574,420, filed on May 19, 2000, now Pat. No. 6,361,583, and a continuation-in-part of application No. 09/574,303, filed on May 19, 2000, now Pat. No. 6,361,582.

(51) Int. Cl.$^7$ .......................... B01D 53/22; B01D 71/32
(52) U.S. Cl. .................. 95/39; 95/47; 95/49; 95/52; 95/54
(58) Field of Search .................. 95/39, 41, 45, 95/47–55, 96–106

(56) References Cited

U.S. PATENT DOCUMENTS

| | | | |
|---|---|---|---|
| 3,133,132 A | 5/1964 | Loeb et al. ............... 264/49 |
| 3,246,450 A | * 4/1966 | Stern et al. ............... 95/55 |
| 3,308,107 A | 3/1967 | Selman et al. ............ 260/87.5 |
| 3,488,335 A | 1/1970 | Braun ..................... 260/88.3 |
| 3,616,607 A | 11/1971 | Klass et al. ............... 55/16 |
| 3,651,618 A | * 3/1972 | Klein et al. ............... 95/45 X |
| 3,798,185 A | 3/1974 | Skiens et al. ............. 260/2.5 |
| 3,865,845 A | 2/1975 | Resnick .................. 260/340.9 |
| 4,230,463 A | 10/1980 | Henis et al. ............... 55/16 |
| 4,243,701 A | 1/1981 | Riley et al. ............... 427/244 |
| 4,398,926 A | * 8/1983 | Doshi ..................... 95/55 |
| 4,399,264 A | 8/1983 | Squire .................... 526/247 |
| 4,431,786 A | 2/1984 | Squire .................... 526/247 |
| 4,548,619 A | * 10/1985 | Steacy .................... 95/55 |
| 4,565,855 A | 1/1986 | Anderson et al. .......... 526/247 |
| 4,594,399 A | 6/1986 | Anderson et al. .......... 526/247 |
| 4,654,063 A | * 3/1987 | Auvil et al. ............... 95/55 X |
| 4,690,695 A | * 9/1987 | Doshi ..................... 95/55 |
| 4,754,009 A | 6/1988 | Squire .................... 526/247 |
| 4,863,761 A | 9/1989 | Puri ....................... 427/175 |
| 4,880,442 A | * 11/1989 | Hayes ..................... 55/16 |
| 4,892,564 A | * 1/1990 | Cooley ................... 95/55 |
| 4,897,457 A | 1/1990 | Nakamura et al. ......... 526/247 |
| 4,910,276 A | 3/1990 | Nakamura et al. ......... 526/247 |
| 5,021,602 A | 6/1991 | Clement et al. ........... 558/230 |
| 5,051,113 A | * 9/1991 | Nemser ................... 95/54 |
| 5,051,114 A | 9/1991 | Nemser et al. ............ 55/16 |
| 5,053,059 A | * 10/1991 | Nemser ................... 95/54 |
| 5,117,272 A | 5/1992 | Nomura et al. ............ 357/52 |
| 5,141,642 A | 8/1992 | Kusuki et al. ............. 210/490 |
| 5,147,417 A | * 9/1992 | Nemser ................... 95/54 |
| 5,156,888 A | * 10/1992 | Haubs et al. .............. 427/163 |
| 5,242,636 A | 9/1993 | Sluma et al. .............. 264/45.8 |
| 5,268,411 A | 12/1993 | Yokotsuka et al. ........ 524/462 |
| 5,286,280 A | * 2/1994 | Chiou ..................... 95/51 X |
| 5,288,304 A | * 2/1994 | Koros et al. .............. 95/54 X |
| 5,318,417 A | 6/1994 | Kopp et al. ............... 425/97 |
| 5,407,466 A | * 4/1995 | Lokhandwala et al. ...... 95/49 |
| 5,498,682 A | 3/1996 | Navarrini et al. .......... 526/247 |
| 5,507,860 A | * 4/1996 | Rao et al. ................. 95/55 X |
| 5,510,406 A | 4/1996 | Matsuo et al. ............. 524/237 |
| 5,647,227 A | 7/1997 | Lokhandwala ............. 62/624 |
| 5,669,958 A | 9/1997 | Baker et al. .............. 95/50 |
| 5,688,307 A | * 11/1997 | Pinnau et al. ............. 95/50 |
| 5,710,345 A | 1/1998 | Navarrini et al. .......... 568/596 |
| 5,772,733 A | * 6/1998 | Lokhandwala et al. ..... 95/50 X |
| 5,779,763 A | * 7/1998 | Pinnau et al. ............. 95/55 X |
| 5,883,177 A | 3/1999 | Colaianna et al. ......... 524/462 |
| 5,962,612 A | 10/1999 | Takakura et al. .......... 526/249 |
| 6,011,192 A | 1/2000 | Baker et al. .............. 585/818 |
| 6,040,419 A | 3/2000 | Drysdale et al. ........... 528/408 |
| 6,053,965 A | * 4/2000 | Lokhandwala ............. 95/50 X |
| 6,128,919 A | * 10/2000 | Daus et al. ............... 95/51 X |
| 6,161,386 A | * 12/2000 | Lokhandwala ............. 95/50 X |
| 6,361,582 B1 | * 3/2002 | Pinnau et al. ............. 95/45 |
| 6,361,583 B1 | * 3/2002 | Pinnau et al. ............. 95/45 |

FOREIGN PATENT DOCUMENTS

EP 0649676 4/1995

OTHER PUBLICATIONS

I. Pinnau et al., "Gas and Vapor Transport Properties of Amorphous Perfluorinated Copolymer Membranes . . . ," J. Membrane Science, 109, p. 125–133 (1996).

A. Alentiev et al., "High Transport Parameters and Free Volume of Perfluorodioxole Copolymers," J. Membrane Science, 126, p. 123–132 (1997).

V. Arcella et al., "A Study on a Perfluoropolymer Purification and Its Application to Membrane Formation," J. Membrane Science, 163, p. 203–209 (1999).

J. Henis, "Chapter 10—Commercial and Practical Aspects of Gas Separation Membranes," in *Polymeric Gas Separation Membranes*, Paul and Yampol'skii (eds.), CRC Press (1994).

S. Ando et al., "Perfluorinated Polymers for Optical Waveguides," Chemtech, Dec. 1994, p. 20–27.

\* cited by examiner

*Primary Examiner*—Robert H. Spitzer
(74) *Attorney, Agent, or Firm*—J. Farrant

(57) ABSTRACT

A process for separating nitrogen from a multicomponent gas mixture containing nitrogen and a hydrocarbon, such as natural gas or associated gas, using gas-separation membranes selective for nitrogen over the hydrocarbon. The membranes use a selective layer made from a polymer having repeating units of a fluorinated polymer, and demonstrate good resistance to plasticization by the organic components in the gas mixture under treatment, and good recovery after exposure to liquid aromatic hydrocarbons.

56 Claims, 10 Drawing Sheets

NITROGEN GAS SEPARATION USING ORGANIC-VAPOR-RESISTANT MEMBRANES

This application is a continuation-in-part of Ser. No. 09/574,420, filed May 19, 2000, now U.S. Pat. No. 6,361,583, and Ser. No. 09/574,303 filed May 19, 2000, now U.S. Pat. No. 6,361,582, both of which are incorporated herein by reference in their entirety.

FIELD OF THE INVENTION

The invention relates to the separation of nitrogen gas from hydrocarbon gas mixtures. The separation is carried out using hydrocarbon-resistant membranes, and is useful in natural gas fields, refineries, petrochemical plants, and the like.

BACKGROUND OF THE INVENTION

Polymeric gas-separation membranes are well known and are in use in such areas as production of oxygen-enriched air, production of nitrogen from air, separation of carbon dioxide from methane, hydrogen recovery from various gas mixtures and removal of organic vapors from air or nitrogen.

The preferred membrane for use in any gas-separation application combines high selectivity with high flux. Thus, the membrane-making industry has engaged in an ongoing quest for polymers and membranes with improved selectivity/flux performance. Many polymeric materials are known that offer intrinsically attractive properties. That is, when the permeation performance of a small film of the material is measured under laboratory conditions, using pure gas samples and operating at modest temperature and pressure conditions, the film exhibits high permeability for some pure gases and low permeability for others, suggesting useful separation capability.

Unfortunately, gas separation in an industrial plant is seldom so simple. The gas mixtures to which the separation membranes are exposed may be hot, contaminated with solid or liquid particles, or at high pressure, may fluctuate in composition or flow rate or, more likely, may exhibit several of these features. Even in the most straightforward situation possible, where the gas stream to be separated is a two-component mix, uncontaminated by other components, at ambient temperature and moderate pressure, one component may interact with the membrane in such a way as to change the permeation characteristics of the other component, so that the separation factor or selectivity suggested by the pure gas measurements cannot be achieved.

In gas mixtures that contain condensable components, for example $C_{3+}$ hydrocarbons, it is frequently, although not always, the case that the mixed gas selectivity is lower, and at times considerably lower, than the ideal selectivity. The condensable component, which is readily sorbed into the polymer matrix, swells or, in the case of a glassy polymer, plasticizes the membrane, thereby reducing its selective capabilities. Carbon dioxide is also known to swell or plasticize many membrane materials. As a result of these effects, a technique for predicting mixed gas performance under real conditions from pure gas measurements with any reliability has not yet been developed.

A good example of an application that is very difficult for membranes is the separation of nitrogen from other gases by selectively permeating nitrogen. First, unless the gas to be separated from the nitrogen is very condensable or has very large molecules (for example volatile organic compounds), essentially no membrane materials are available that will permeate the nitrogen preferentially over the second gas with anything more than the most meager selectivity. In addition many materials that are somewhat nitrogen-selective have very low gas permeability. Secondly, such materials as are known to be nitrogen-selective, such as certain polyimides, are swelled or plasticized to such an extent in the presence of hydrocarbons or carbon dioxide that their use in any real-world industrial nitrogen/methane separation is not practical.

One specific case where nitrogen-selective membranes with adequate properties would be useful is in natural gas treatment. Natural gas provides more than one-fifth of all the primary energy used in the United States, but much raw gas is "subquality", that is, it exceeds the pipeline specifications in nitrogen, carbon dioxide and/or hydrogen sulfide content. For example, fourteen percent of known U.S. natural gas reserves contain more than 4% nitrogen. Currently, the principal technology available to remove nitrogen from natural gas and other hydrocarbon gas streams is cryogenic separation. Cryogenic plants are expensive and complicated, however, and the feed gas must be subjected to extensive pretreatment, so their economic feasibility is limited.

Other processes that have been considered for performing this separation include pressure swing adsorption, lean oil absorption, and membrane separation using methane-selective, nitrogen-rejecting membranes, as taught in U.S. Pat. Nos. 5,669,958 and 5,647,227. One problem of using methane-selective membranes to treat natural gas, however, is that the methane-rich product is retrieved as a low-pressure permeate and must be recompressed. Also, the membranes must be operated at very low temperature.

U.S. Pat. No. 3,616,607 to Northern Natural Gas Company, discloses membrane-based separation of nitrogen from methane for natural gas treatment, using nitrogen-selective membranes. The patent reports extraordinarily high nitrogen/methane selectivities up to 15 and 16. These numbers are believed to be erroneous and have not been confirmed elsewhere in the literature. Also, the membranes with these alleged selectivities were made from polyacrylonitrile, a material with extremely low gas permeability of the order $10^{-4}$ Barrer (ten thousandths of a Barrer) that would be impossible to use for a real process.

Thus, the need remains for membranes that will provide adequate nitrogen-selective separation performance, and that will be able to maintain such performance under the conditions of exposure to organic vapors, and particularly $C_{3+}$ hydrocarbons, that are commonplace in gas fields, chemical plants and the like.

Films or membranes made from fluorinated polymers having a ring structure in the repeat unit are known. For example:

1. U.S. Pat. Nos. 4,897,457 and 4,910,276, both to Asahi Glass, disclose various perfluorinated polymers having repeating units of perfluorinated cyclic ethers, and cite the gas-permeation properties of certain of these, as in column 8, lines 48–60 of U.S. Pat. No. 4,910,276.
2. A paper entitled "A study on perfluoropolymer purification and its application to membrane formation" (V. Arcella et al., *Journal of Membrane Science*, Vol. 163, pages 203–209 (1999)) discusses the properties of membranes made from a copolymer of tetrafluoroethylene and a dioxole. Gas permeation data for various gases are cited.
3. European Patent Application 0 649 676 A1, to L'Air Liquide, discloses post-treatment of gas separation membranes by applying a layer of fluoropolymer, such as a perfluorinated dioxole, to seal holes or other defects in the membrane surface.

4. U.S. Pat. No. 5,051,114, to Du Pont, discloses gas separation methods using perfluoro-2,2-dimethyl-1,3-dioxole polymer membranes. This patent also discloses comparative data for membranes made from perfluoro(2-methylene-4-methyl-1,3-dioxolane) polymer (Example XI).
5. A paper entitled "Gas and vapor transport properties of amorphous perfluorinated copolymer membranes based on 2,2-bistrifluoromethyl-4,5-difluoro-1,3dioxole/tetrafluoroethylene" (I. Pinnau et al., *Journal of Membrane Science,* Vol. 109, pages 125–133 (1996)) discusses the free volume and gas permeation properties of fluorinated dioxole/tetrafluoroethylene copolymers compared with substituted acetylene polymers. This reference also shows the susceptibility of this dioxole polymer to plasticization by organic vapors and the loss of selectivity as vapor partial pressure in a gas mixture increases (FIGS. 3 and 4).

Most of the data reported in the prior art references listed above are for permanent gases, carbon dioxide and methane, and refer only to measurements made with pure gases. The data reported in item 5 indicate that even these fluorinated polymers, which are characterized by their chemical inertness, appear to be similar to conventional membranes in their inability to withstand exposure to propane and heavier hydrocarbons.

SUMMARY OF THE INVENTION

The invention is a process for separating nitrogen from a gaseous hydrocarbon in a gas mixture. Such a mixture might typically, but not necessarily, be encountered during the processing of natural gas, of associated gas from oil wells, or of certain petrochemical streams. The mixture is typically a multicomponent mixture, containing the gaseous hydrocarbon from which it is desired to separate nitrogen, as well as at least one other gaseous component such as another hydrocarbon, carbon dioxide, hydrogen, oxygen or water vapor, for example.

The separation is carried out by running a stream of the gas mixture across a membrane that is selective for nitrogen over the hydrocarbon from which it is to be separated. The process results, therefore, in a permeate stream enriched in nitrogen and a residue stream depleted in nitrogen. The process can separate nitrogen from methane, nitrogen from $C_{2+}$ or $C_{3+}$ hydrocarbons, such as light paraffins or olefins, nitrogen from volatile organic compounds (VOCs), including halogenated compounds, or any combination of these, for example.

The process differs from processes previously available in the art in that:
(i) the membranes are able to provide useful separation properties for multicomponent gas mixtures, including, but not limited to, gas mixtures containing $C_{3+}$ hydrocarbon vapors and/or carbon dioxide, even at high levels in the gas mixture,
(ii) the membranes can recover from accidental exposure to liquid organic compounds, and
(iii) the membranes have high nitrogen/hydrocarbon selectivity coupled with high nitrogen permeability.

To provide these attributes, the membranes used in the process of the invention are made from a glassy polymer or copolymer. The polymer is characterized by having repeating units of a fluorinated, cyclic structure, the ring having at least five members. The polymer is further characterized by a fractional free volume no greater than about 0.3 and preferably by a glass transition temperature, Tg, of at least about 100° C. Preferably, the polymer is perfluorinated.

In the alternative, the membranes are characterized in terms of their selectivity before and after exposure to liquid hydrocarbons. Specifically, the membranes have a post-exposure selectivity for nitrogen over the gaseous hydrocarbon from which it is desired to separate nitrogen, after exposure of the separation membrane to a liquid hydrocarbon, for example, toluene, and subsequent drying, that is at least about 60%, 65% or even 70% of a pre-exposure selectivity for nitrogen over the gaseous hydrocarbon, the pre- and post-exposure selectivities being measured with a test gas mixture of the same composition and under like conditions.

In this case, the selective layer is again made from an amorphous glassy polymer or copolymer with a fractional free volume no greater than about 0.3 and a glass transition temperature, Tg, of at least about 100° C. The polymer is fluorinated, generally heavily fluorinated, by which we mean having a fluorine:carbon ratio of atoms in the polymer of at least about 1:1. Preferably, the polymer is perfluorinated. In this case the polymer need not incorporate a cyclic structure.

Therefore, in a basic embodiment, the process of the invention includes the following steps:
(a) bringing a multicomponent gas mixture comprising nitrogen, a gaseous hydrocarbon, and at least one other gaseous component into contact with the feed side of a separation membrane having a feed side and a permeate side, the membrane having a selective layer comprising: a polymer comprising repeating units having a fluorinated cyclic structure of an at least 5-member ring, the polymer having a fractional free volume no greater than about 0.3;
(b) providing a driving force for transmembrane permeation;
(c) withdrawing from the permeate side a permeate stream enriched in nitrogen compared to the gas mixture;
(d) withdrawing from the feed side a residue stream depleted in nitrogen compared to the gas mixture.

In the alternative, a basic embodiment of the process includes the following steps:
(a) bringing a multicomponent gas mixture comprising nitrogen, a gaseous hydrocarbon, and at least one other gaseous component into contact with the feed side of a separation membrane having a feed side and a permeate side, the membrane having a selective layer comprising a polymer having:
  (i) a ratio of fluorine to carbon atoms in the polymer greater than 1:1;
  (ii) a fractional free volume no greater than about 0.3; and
  (iii) a glass transition temperature of at least about 100° C.; and the separation membrane being characterized by a post-exposure selectivity for nitrogen over the gaseous hydrocarbon, after exposure of the separation membrane to liquid toluene and subsequent drying, that is at least about 65% of a pre-exposure selectivity for nitrogen over the gaseous hydrocarbon, as measured pre- and post-exposure with a test gas mixture of the same composition and under like conditions;
(b) providing a driving force for transmembrane permeation;
(c) withdrawing from the permeate side a permeate stream enriched in nitrogen compared to the gas mixture;
(d) withdrawing from the feed side a residue stream depleted in nitrogen compared to the gas mixture.

The permeating nitrogen may have value as an enriched product, or may be a contaminant that it is desired to remove from the gas mixture. Thus, either the permeate stream or the residue stream, or both, may be the useful products of the process.

Examples of hydrocarbons from which nitrogen may be separated include, but are not limited to, paraffins, both straight and branched, for example, methane, ethane, propane, butanes, pentanes, and hexanes; olefins and other aliphatic unsaturated organics, for example, ethylene, propylene, and butene; aromatic hydrocarbons, for example, benzene, toluene, and xylenes; vapors of halogenated compounds, amines, alcohols and ketones; and diverse other volatile organic compounds. In many cases, the gas mixture to be treated contains a multiplicity of these components.

Particularly preferred materials for the selective layer of the membrane used to carry out the process of the invention are amorphous homopolymers of perfluorinated dioxole, dioxolanes or cyclic alkyl ethers, or copolymers of these with tetrafluoroethylene. Specific most preferred materials are copolymers having the structure:

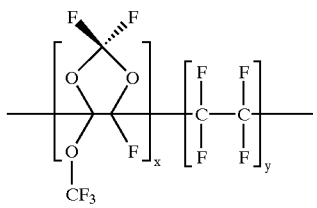

where x and y represent the relative proportions of the dioxole and the tetrafluoroethylene blocks, such that x+y=1.

A second highly preferred material has the structure:

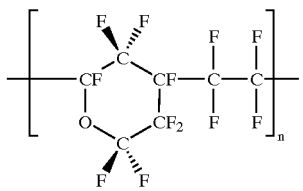

where n is a positive integer.

Contrary to what would be expected from the data presented in the Pinnau et al. *Journal of Membrane Science* paper, we have unexpectedly found that membranes formed from fluorinated cyclic polymers as characterized above can withstand exposure to $C_{3+}$ hydrocarbons well enough to provide useful separation capability for gas mixtures that include $C_{3+}$ hydrocarbon vapors. This resistance persists even when the $C_{3+}$ hydrocarbons are present at high levels, such as 5%, 10%, 15% or even more.

Thus, a particularly important advantage of the invention is that the membranes can retain selectivity for nitrogen, even in the presence of streams rich in, or even essentially saturated with, $C_{3+}$ hydrocarbon vapors. This distinguishes these membrane materials from all other membrane materials previously used commercially for nitrogen separations.

Membranes made from fluorinated dioxoles have been believed previously to behave like conventional membrane materials in suffering from debilitating plasticization in a hydrocarbon-containing environment, to the point that they may even become selective for hydrocarbons over permanent gases even at moderate $C_{3+}$ hydrocarbon partial pressures. We have discovered that this is not the case for the membranes taught herein. This unexpected result is achieved because the membranes used in the invention are unusually resistant to plasticization by hydrocarbon vapors.

The membranes are also resistant to contact with liquid hydrocarbons, in that they are able to retain their selectivity for nitrogen after prolonged exposure to liquid toluene, for example. This is a second beneficial characteristic that differentiates the processes of the invention from prior art processes. In the past, exposure of the membranes to liquid hydrocarbons frequently meant that the membranes were irreversibly damaged and had to be removed and replaced.

Besides withstanding exposure during use, their resistance to hydrocarbons enables the membranes and modules to be cleaned with hydrocarbon solvents to remove oils or other organic materials that may have been deposited during operation. This is an additional and beneficial improvement over processes previously available in the art.

These unexpected and unusual attributes render the process of the invention useful, not only in situations where commercial gas separation membranes have been previously used, but also in situations where it was formerly difficult or impractical for membrane separation to be used, or where membrane lifetimes were poor.

Because the preferred polymers are glassy and rigid, an unsupported film of the polymer may be usable in principle as a single-layer gas separation membrane. However, such layer will normally be far too thick to yield acceptable transmembrane flux, and in practice, the separation membrane usually comprises a very thin selective layer that forms part of a thicker structure, such as an asymmetric membrane or a composite membrane. The making of these types of membranes is well known in the art.

If the membrane is a composite membrane, the support layer may optionally be made from a fluorinated polymer also, making the membrane a totally fluorinated structure and enhancing chemical resistance. The membrane may take any form, such as hollow fiber, which may be potted in cylindrical bundles, or flat sheets, which may be mounted in plate-and-frame modules or formed into spiral-wound modules.

The driving force for permeation across the membrane is the pressure difference between the feed and permeate sides, which can be generated in a variety of ways. The pressure difference may be provided by compressing the feed stream, drawing a vacuum on the permeate side, or a combination of both. The membrane is able to tolerate high feed pressures, such as above 200 psia, 300 psia, 400 psia or more.

As mentioned above, the membrane is able to operate satisfactorily in the presence of $C_{3+}$ hydrocarbons at high levels. Thus the partial pressure of the hydrocarbons in the feed may be close to saturation. For example, depending on the mix of hydrocarbons and the temperature of the gas, the aggregate partial pressure of all $C_{3+}$ hydrocarbons in the gas might be as much as 10 psia, 15 psia, 25 psia, 50 psia, 100 psia, 200 psia or more. Expressed as a percentage of the saturation vapor pressure at that temperature, the partial pressure of hydrocarbons, particularly $C_{3+}$ hydrocarbons, may be 20%, 30%, 50% or even 70% or more of saturation.

The carbon dioxide partial pressure may also be relatively high, such as 25 psia, 50 psia, 100 psia or above.

The membrane separation process may be configured in many possible ways, and may include a single membrane unit or an array of two or more units in series or cascade arrangements. The processes of the invention also include combinations of the membrane separation process defined above with other separation processes, such as adsorption, absorption, distillation, condensation or other types of membrane separation.

The scope of the invention in this aspect is not intended to be limited to any particular gas streams, but to encompass any situation where a gas stream containing nitrogen and a gaseous hydrocarbon is to be separated. The composition of treatable gas streams varies widely, and the individual components may be present in any quantities. Thus, feed gas streams may contain just a few percent nitrogen, or 90% nitrogen or more. The gas may contain a single hydrocarbon component, such as methane, ethylene or a chlorinated solvent, or a mix of numerous hydrocarbons, such as $C_1$–$C_8$ hydrocarbons or heavier. The third component of the gas stream may be a second hydrocarbon, an inert gas, carbon dioxide, water vapor, hydrogen, oxygen or any other component.

It is envisaged that the process will be particularly useful as part of a natural gas processing train. Pipeline specification for natural gas is usually no more than about 4% nitrogen, but raw gas frequently contains more than 4% nitrogen and not infrequently contains 10% nitrogen or more. The process of the invention enables gas that is out of specification with respect to nitrogen to be brought to pipeline specification. Furthermore, since the membranes used are able to withstand other contaminants in the gas, the nitrogen removal steps may be performed upstream of other gas treatments, if required. This provides greater flexibility in plant design and operation than is often possible using prior art nitrogen separation methods. Gas associated with oil wells and landfills falls within this general type of treatable gas stream.

Other application areas where the process is expected to be useful include, but are not limited to, treatment of off-gases from polyolefin manufacturing and treatment of waste air streams containing organic vapors.

The process of the invention can provide a selectivity, in gas mixtures, for nitrogen over methane of as high as 2, 2.5 or even 3, even in the presence of significant amounts of $C_{3+}$ hydrocarbons or carbon dioxide. Although these numbers seem small, they are remarkable, in that few prior art membrane materials offer any selectivity at all for nitrogen over methane. For example, polysulfone, cellulose acetate and polycarbonate all have nitrogen/methane selectivity of only about 1 or below, that is, they often exhibit slight methane/nitrogen selectivity. Non-perfluorinated polyimides, the best group of prior art materials in this regard, offer typical nitrogen/methane selectivity, even as measured with pure gases, only in the range between 1 and 2.3. The nitrogen/methane selectivity tends to increase as the operating temperature declines, so it is often preferable to cool the feed gas by heat exchange or otherwise before passing it into the membrane separation unit.

The process of the invention can also provide selectivity, in gas mixtures, for nitrogen over ethylene of as high as 3, 4, 5 or above, and for nitrogen over $C_{3+}$ hydrocarbons of at least about 10, and frequently much higher, such as at least about 20 or above.

It is an object of the present invention to provide a membrane-based process for separation of nitrogen from a gaseous hydrocarbon.

It is an object of the present invention to provide a membrane-based process for treating out-of-specification natural gas.

Additional objects and advantages of the invention will be apparent from the description below to those of ordinary skill in the art.

It is to be understood that the above summary and the following detailed description are intended to explain and illustrate the invention without restricting its scope.

DETAILED DESCRIPTION OF THE INVENTION

Figure 1:
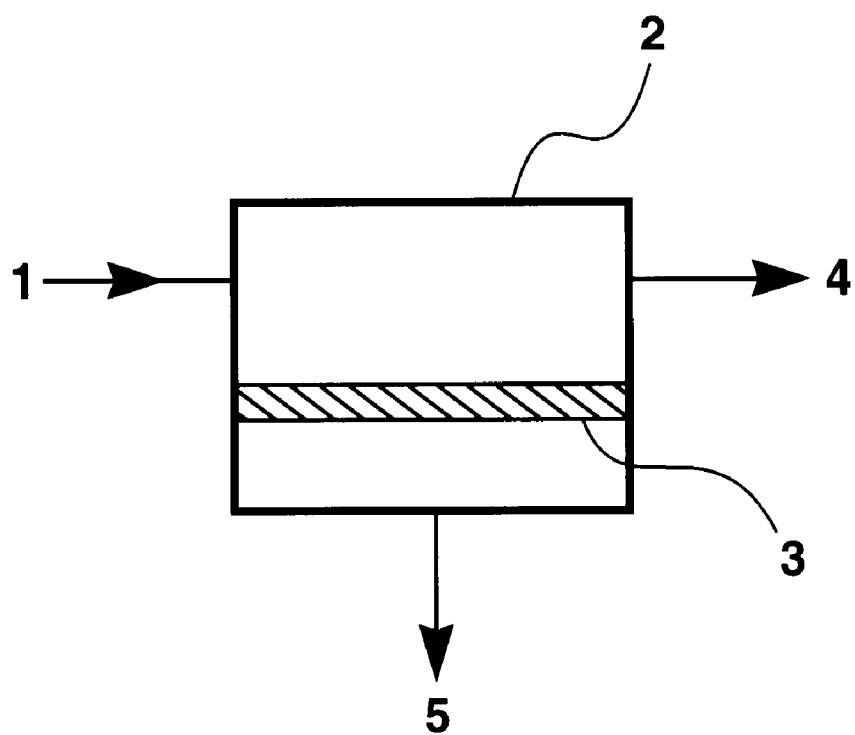
FIG. 1 is a schematic representation of the process of the invention in its most basic form.

The term gas as used herein means a gas or a vapor.

The terms hydrocarbon and organic vapor or organic compound are used interchangeably herein, and include, but are not limited to, saturated and unsaturated compounds of hydrogen and carbon atoms in straight chain, branched chain and cyclic configurations, including aromatic configurations, as well as compounds containing oxygen, hydrogen, halogen or other atoms.

The term $C_{2+}$ hydrocarbon means a hydrocarbon having at least two carbon atoms; the term $C_{3+}$ hydrocarbon means a hydrocarbon having at least three carbon atoms; and so on.

The terms light hydrocarbon and light olefin refer to molecules having no more than about six carbon atoms.

The term heavier hydrocarbon means a $C_{3+}$ hydrocarbon.

The term multicomponent gas mixture means a mixture containing at least nitrogen, a gaseous hydrocarbon and at least one other gaseous component. The components may be present in any proportions.

All percentages herein are by volume unless otherwise stated.

The invention is a process for separating nitrogen from a hydrocarbon component in a gas mixture, such as might be encountered during the processing of natural gas, for example. The separation is carried out by running a stream of the gas mixture across a membrane that is selective for nitrogen over the hydrocarbon component from which it is to be separated. The process results, therefore, in a permeate stream enriched in nitrogen and depleted in the hydrocarbon, and a residue stream depleted in nitrogen and enriched in the hydrocarbon.

The scope of the invention is not limited to any particular gas streams, but encompasses any situation where a multicomponent gas stream containing nitrogen and a hydrocarbon gas is to be treated. The composition of the gas may vary widely, by way of non-limiting examples, from a mixture that contains a minor amount of nitrogen, such as a few percent, in admixture with various hydrocarbon components up to $C_8$ hydrocarbons or heavier, to a mixture of mostly nitrogen with ethylene or methane, to air containing one or more organic vapors.

Besides nitrogen and the hydrocarbon from which the nitrogen is to be separated, the gas may contain any other components. Representative, but non-limiting examples of gases or vapors that may be found in the gas mixture to be treated include acid gases, such as carbon dioxide or hydrogen sulfide; water vapor; inert gases, such as argon or helium; other permanent gases, such as oxygen or hydrogen; carbon monoxide; and $C_{2+}$ hydrocarbons, such as paraffins, olefins, aromatics, alcohols, halogenated compounds, and so on.

The feed gas mixture to be separated often contains multiple hydrocarbon components in addition to nitrogen. The goal of the process maybe to separate one, some or all of these components from the nitrogen.

As one non-limiting example, the gas mixture may be raw natural gas containing methane, ethane, $C_{3-8}$ hydrocarbons, hydrogen sulfide, water vapor, nitrogen and carbon dioxide. For natural gas to be accepted into the pipeline, it must normally contain no more than about 4% nitrogen. The goal of the process may then be to reduce the nitrogen content of the raw gas to 4% or below. The process might then provide a permeate enriched in carbon dioxide and nitrogen and a product residue stream enriched in all hydrocarbons compared with the raw gas.

As an alternative, the raw natural gas may be treated to reduce the nitrogen content to the point where the gas is acceptable as turbine or engine fuel, as a steam reformer feedstock or the like. In this case, a residue nitrogen content higher than 4% may be acceptable. For example, steam reforming is widely used to make hydrogen for fuel cells. Excess nitrogen in the natural gas feed may react with the catalyst and the newly-formed hydrogen in the reformer section to produce ammonia. Even though these reactions produce only ppm levels of ammonia, this may be enough to damage the fuel cell stack and reduce its useful lifetime. By reducing the natural gas nitrogen content to about 6%, these problems can be avoided.

As a second non-limiting example, the feed gas stream may arise as a result of oil or gas extraction by miscible flood operations. In these operations, nitrogen is injected into the ground at the periphery of an oil reservoir. The gas dissolves in the oil left in the pore space of the formation and lowers its viscosity. The resulting mixture is then pushed by water or gas pressure to the extraction wells. Initially the associated gas extracted with the oil is rich in methane, but over time the methane concentration falls and the nitrogen concentration rises, to as much as 80 or 90%. The mixture extracted from the wells is separated into recovered oil, produced water, nitrogen for reinjection, and condensed hydrocarbon liquids (NGL). Separation of the nitrogen from the methane and other hydrocarbons in the associated gas is important for the process to be economically sound.

In this case, the raw gas stream may contain large amounts of nitrogen, a mix of relatively heavy $C_{3+}$ hydrocarbons and only small amounts of methane. The process might then provide a permeate comprising mostly nitrogen of a quality suitable for reinjection, and a residue stream of mixed hydrocarbons, to be used as fuel gas or subjected to additional processing, such as cooling and phase separation, for example, for recovery of NGL and/or pipeline grade gas.

As a third non-limiting example, the feed stream may be a gas stream from a petrochemical manufacturing process, comprising a petrochemical feedstock, such as ethylene or propylene, as well as nitrogen and light paraffins or other inert gases. Such streams arise, for example, from manufacture of primary petrochemicals, chemical intermediates, fuels, polymers, agricultural chemicals and the like. A particular example is the manufacture of polyolefins. In a typical polymerization process, the raw polymer product contains significant amounts of unreacted monomer, and may contain small amounts of solvents, catalysts, stabilizers, other hydrocarbons or any other materials, depending on the manufacturing process used.

To remove these contaminants, the raw polymer resin is passed to large bins, where nitrogen is used to purge them out. The vent gas from this step contains nitrogen, olefin monomer, and other process-specific materials. Such gas may be treated to produce a nitrogen-enriched permeate stream, either as a waste stream, or from which nitrogen can be recovered for reuse as purge gas, and an olefin-enriched residue stream for return to the polymerization reactor, either directly or after further treatment.

As a fourth non-limiting example, the feed stream may be an off-gas stream from one of the numerous industrial processes that produce waste streams containing organic vapors in air or nitrogen. Sources of such streams include use of organic solvents in coating, spraying, cleaning, painting, or printing applications of all kinds; organic liquid storage tank vents; chemical manufacturing; and foundry cold boxes using organic catalysts for metal casting. Diverse organic vapors may be present in streams of these types, including, for example, halogenated solvents, alkyl amines, ketones or alcohols.

The process of the invention may be used to permeate the oxygen and nitrogen, leaving an organic-enriched residue stream from which the organic solvent can be recovered for reuse. As it relates to separation of nitrogen from larger and more complex organic molecules, such as halogenated solvents or amines, the process of the invention can often provide very high mixed-gas selectivities, such as 20, 40, 50, 100 or higher, depending on the nature of the organic compound and the process conditions.

As a fifth non-limiting example, the feed stream may be landfill gas containing air, that is, nitrogen and oxygen, as well as carbon dioxide and methane. The process of the invention may be used to permeate oxygen, nitrogen, and carbon dioxide, leaving a methane-rich high quality residue product gas.

In each case, the cut between nitrogen and hydrocarbons may be made to achieve as much separation from any specific hydrocarbon as is desired, subject of course to the relative permeabilities of the hydrocarbons in the mix.

The process of the invention in its most basic form is shown in FIG. 1. Referring to this figure, a feedstream, 1, comprising a gas mixture including nitrogen and at least one organic compound, is passed into membrane separation unit 2 and flows across the feed side of membrane 3. The membrane is characterized by having a selective layer comprising a polymer containing repeat units having a fluorinated cyclic structure of an at least 5-member ring, the polymer having a fractional free volume no greater than about 0.3. Under a pressure difference between the feed and permeate sides of the membrane, nitrogen passes preferentially to the permeate side, and nitrogen-enriched stream, 5, is withdrawn from the permeate side. The remaining nitrogen-depleted, organic-compound-enriched residue stream, 4, is withdrawn from the feed side. The permeate stream or the residue stream, or both, may be the useful products of the process.

The process differs from processes previously available in the art in that:
(i) the membranes are able to maintain useful separation properties in the presence of organic vapors, such as $C_{3+}$ hydrocarbons, even at high levels in the gas,
(ii) the membranes are able to withstand high partial pressures of carbon dioxide,
(iii) the membranes can recover from accidental exposure to liquid organic compounds, and
(iv) the membranes have high nitrogen/hydrocarbon selectivity in conjunction with high nitrogen permeability.

As mentioned in the Summary section above, the process of the invention typically provides a selectivity, in mixtures containing multiple hydrocarbons including a $C_{3+}$ hydrocarbon, for nitrogen over methane of at least about 2, even if the gas mixture also contains carbon dioxide at high activity levels. Likewise, the process of the invention typically provides a nitrogen/$C_{3+}$ hydrocarbon selectivity of at least about 10.

In conjunction with high selectivity, the unusually high permeability of the preferred membrane materials means that the process of the invention can frequently provide a transmembrane pressure-normalized nitrogen flux of at least about 10 GPU, (where 1 GPU=$1 \times 10^{-6}$ cm$^3$(STP)/cm$^2 \cdot$s$\cdot$cmHg) and sometimes higher, such as 25 GPU, 50 GPU or even higher, and in some instances as high as 100 GPU or more.

To provide these attributes, the process differs from previous gas/organic vapor separation processes in the nature of the membrane, 3, that is used. The membranes used in the process of the invention are made from a glassy polymer, characterized by having repeating units of a fluorinated, cyclic structure, the ring having at least five members. The polymer is further characterized by a fractional free volume no greater than about 0.3 and preferably by a glass transition temperature, Tg, of at least about 100° C. Preferably, the polymer is perfluorinated.

In the alternative, the membranes are characterized in terms of their selectivity before and after exposure to liquid hydrocarbons. Specifically, the membranes have a post-exposure selectivity for nitrogen over the gaseous hydrocarbon from which it is to be separated, after exposure of the separation membrane to a liquid hydrocarbon, for example, toluene, and subsequent drying, that is at least about 60%, 65% or even 70% of a pre-exposure selectivity for nitrogen over the gaseous hydrocarbon, the pre- and post-exposure selectivities being measured with a test gas mixture of the same composition and under like conditions.

In applying this test to determine whether the membrane is suitable for use in the process of the invention, it is important to test the membrane itself, and not just a film of the selective layer polymer. A thick film, for example 50 μm or more thick, of the selective layer polymer may appear to resist dissolution and swelling and maintain selectivity, even when soaked for days in liquid hydrocarbon. However, when used in an asymmetric or composite membrane with a selective layer thin enough to provide useful transmembrane flux for the desired gas (which may mean a selective layer as thin as 10 μm, 5 μm, 1 μm or less), the same material may disintegrate within minutes of contact with the hydrocarbon liquid.

It is also important that the test gas mixtures used to measure the selectivity before and after exposure have essentially the same composition, and that the test be carried out under essentially the same conditions of pressure, temperature, gas flow and membrane area, since all of these parameters may have an effect on selectivity. The test gas mixture should obviously contain nitrogen and the gaseous hydrocarbon, for example, methane, propane, ethylene or propylene, from which it is desired to separate nitrogen, but need not be identical in composition to the feed gas mixture to the process, since this may change from time to time in any case.

It is preferred that the hydrocarbon liquid to which the membrane is exposed in the test is an aromatic liquid, such as toluene, rather than a paraffin, for example, since this provides more aggressive test conditions. The test can be carried out in any convenient manner. A simple and preferred protocol is to measure the membrane selectivity using a bench-top test cell apparatus such as is familiar to those of skill in the art, remove the membrane stamp from the test cell, immersing it in liquid toluene for a period, remove it, dry it in air and retest it as before. For an adequate test, the period of immersion should be representative of the exposure that might occur during a system upset when the membrane is in use, such as one or two hours, or overnight (about eight hours).

In this case the polymer need not incorporate a cyclic structure. The selective layer is again made from an amorphous glassy polymer or copolymer with a fractional free volume no greater than about 0.3 and a glass transition temperature, Tg, of at least about 100° C. The polymer is fluorinated, generally heavily fluorinated, by which we mean having a fluorine:carbon ratio of atoms in the polymer of at least about 1:1. Preferably, the polymer is perfluorinated, even if the perfluorinated structure has a less than 1:1 fluorine:carbon ratio.

The preferred cyclic or non-cyclic polymers are not new materials in themselves. In fact, general polymer formulations embracing those suitable for use in the invention are described in patents dating back from the present day to the 1960s, for example, U.S. Pat. Nos. 3,308,107; 3,488,335; 3,865,845; 4,399,264; 4,431,786; 4,565,855; 4,594,399; 4,754,009; 4,897,457; 4,910,276; 5,021,602; 5,117,272; 5,268,411; 5,498,682; 5,510,406; 5,710,345; 5,883,177; 5,962,612; and 6,040,419.

The ring structure within the repeat units may be aromatic or non-aromatic, and may contain other atoms than carbon, such as oxygen atoms. Preferred polymers for the selective layer of the membrane are formed from fluorinated monomers of (i) dioxoles, which are five-member rings of the form

that polymerize by opening of the double bond, or (ii) dioxolanes, similar five-member rings but without the double bond in the main ring, or (iii) aliphatic structures having an alkyl ether group, polymerizable into cyclic ether repeat units with five or six members in the ring.

Not all polymers within the above structural definitions and preferences are suitable for use as membrane selective layers in the invention. For example, certain of the polymers and copolymers of perfluoro-2,2-dimethyl-1,3-dioxole reported in U.S. Pat. No. 5,051,114 have been shown to be susceptible to plasticization to the point of switching from being selective for nitrogen over hydrocarbons to being selective for hydrocarbons over nitrogen as the hydrocarbon partial pressure increases.

These polymers are, however, characterized by very high fractional free volume within the polymer, typically above 0.3. For example, a paper by A. Yu. Alentiev et al, "High transport parameters and free volume of perfluorodioxole copolymers", *Journal of Membrane Science*, Vol. 126, pages 123–132 (1997) reports fractional free volumes of 0.32 and 0.37 for two grades of perfluoro-2,2-dimethyl-1,3-dioxole copolymers (Table 1, page 125).

Likewise, these polymers are of low density compared with other polymers, such as below about 1.8 g/cm³ and are unusually gas permeable, for instance exhibiting pure gas permeabilities as high as 1,000 Barrer or more for oxygen and as high as 2,000 Barrer or more for hydrogen.

It is believed that polymers with denser chain packing, and thus lower fractional free volume, higher density and lower permeability, are more resistant to plasticization. Hence, the polymers used in the invention to form the selective, discriminating layer of the membrane should preferably be limited, in addition to the specific structural limitations defined and discussed above, to those having a fractional free volume less than about 0.3.

In referring to fractional free volume (FFV), we mean the free volume per unit volume of the polymer, defined and calculated as:

$$FFV = SFV/v_{sp}$$

where SFV is the specific free volume, calculated as:

$$SFV = v_{sp} - v_0 = v_{sp} - 1.3 v_w$$

and where:

$v_{sp}$ is the specific volume (cm³/g) of the polymer determined from density or thermal expansion measurements, $v_0$ is the zero point volume at 0° K., and $v_w$ is the van der Waals volume calculated using the group contribution method of Bondi, as described in D. W. van Krevelan, *Properties of Polymers*, 3$^{rd}$ Edition, Elsevier, Amsterdam, 1990, pages 71–76.

Expressed in terms of density, the selective layer polymers should preferably have a density above about 1.8 g/cm³. Expressed in terms of permeability, the selective layer polymers will generally exhibit an oxygen permeability no higher than about 300 Barrer, more typically no higher than about 100 Barrer, and a hydrogen permeability no higher than about 1,000 Barrer, more typically no higher than about 500 Barrer.

Since the polymers used for the selective layer need to remain rigid and glassy during operation, they should also have glass transition temperatures comfortably above temperatures to which they are typically exposed during the process. Polymers with glass transition temperature above about 100° C. are preferred, and, subject also to the other requirements and preferences above, the higher the glass transition temperature, in other words, the more rigid the polymer, the more preferred it is.

The polymers should preferably take amorphous, rather than crystalline form, because crystalline polymers are typically essentially insoluble and thus render membrane making difficult, as well as exhibiting low gas permeability.

As stated above, the polymers are fluorinated. More preferably, they have a fluorine:carbon ratio of atoms in the polymer of at least about 1:1, and most preferably, they are perfluorinated.

The polymers may be homopolymers of the repeating units of fluorinated cyclic structures defined above. Optionally, they may be copolymers of such repeat units with other polymerizable repeat units. For preference, these other repeat units should be at least partially fluorinated, and most preferably heavily fluorinated or perfluorinated. A number of suitable materials are known, for example, fluorinated ethers, ethylene and propylene. Particularly when perfluorinated, homopolymers made from these materials, such as polytetrafluoroethylene (PTFE) and the like, are very resistant to plasticization. However, they tend to be crystalline or semi-crystalline and to have gas permeabilities too low for any useful separation application. As constituents of copolymers with the fluorinated ring structures defined above, however, they can produce materials that combine amorphous structure, good permeability and good resistance to plasticization. Copolymers that include tetrafluoroethylene units are particularly preferred. Other specific examples of copolymers that are suitable are polyhexafluoropropylene and chlorofluoro ethylenes and propylene.

Specific most preferred materials are copolymers of tetrafluoroethylene with 2,2,4-trifluoro-5-trifluoromethoxy-1,3-dioxole having the structure:

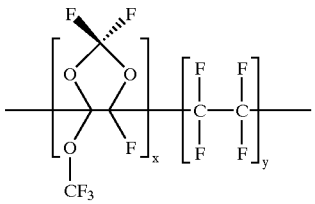

where x and y represent the relative proportions of the dioxole and the tetrafluoroethylene blocks, such that x+y=1.

Such materials are available commercially from Ausimont S.p.A., of Milan, Italy under the trade name Hyflon® AD. Different grades are available varying in proportions of the dioxole and tetrafluoroethylene units, with fluorine:carbon ratios of between 1.5 and 2, depending on the mix of repeat units. For example, grade Hyflon AD60 contains a 60:40 ratio of dioxole to tetrafluoroethylene units, has a fractional free volume of 0.23, a density of 1.93 g/cm³ and a glass transition temperature of 121° C., and grade Hyflon AD80 contains an 80:20 ratio of dioxole to tetrafluoroethylene units, has a fractional free volume of 0.23, a density of 1.92 g/cm³ and a glass transition temperature of 134° C.

A second highly preferred group of materials is the set of polyperfluoro (alkenyl vinyl ethers) including polyperfluoro (allyl vinyl ether) and polyperfluoro (butenyl vinyl ether). A specific most preferred material of this type has the structure:

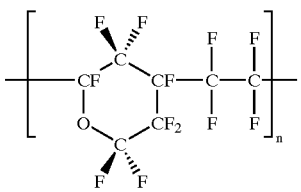

where n is a positive integer.

This material is available commercially from Asahi Glass Company, of Tokyo, Japan under the trade name Cytop® Cytop has a fractional free volume of 0.21, a density of 2.03 g/cm³, a glass transition temperature of 108° C., and a fluorine:carbon ratio of 1.7.

A third group of materials that is believed to contain useful selective layer materials is perfluorinated polyimides.

Such materials have been investigated for use as optical waveguides, and their preparation is described, for example, in S. Ando et al., "Perfluorinated polymers for optical waveguides", CHEMTECH, December, 1994. To be usable as membrane materials, the polyimides have to be capable of being formed into continuous films. Thus, polyimides that incorporate ether or other linkages that give some flexibility to the molecular structure are preferred.

Particular examples are polymers comprising repeat units prepared from the perfluorinated dianhydride 1,4-bis(3,4-dicarboxytrifluorophenoxy) tetrafluorobenzene (10FEDA), which has the structure:

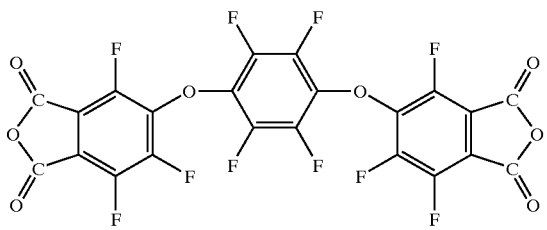

Diamines with which 10FEDA can be reacted to form polyamic acids and hence polyimides include 4FMPD, which has the structure:

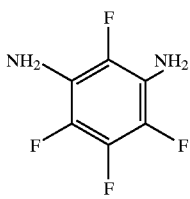

The resulting 10FEDA/4FMPD polyimide has the repeat unit structure:

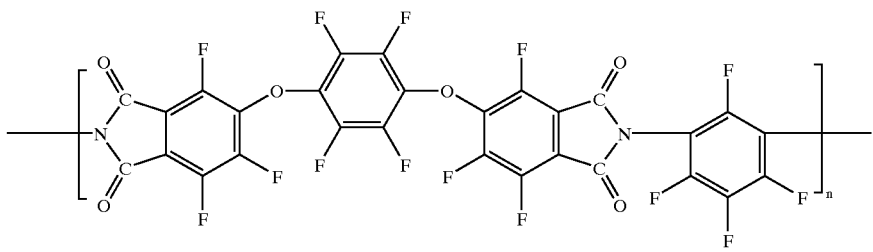

where n is a positive integer.

Yet further discussion of membrane materials is included in co-owned U.S. Pat. No. 6,361,582, entitled "Gas Separation Using $C_{3+}$ Hydrocarbon Resistant Membranes" incorporated herein by reference in its entirety.

The polymer chosen for the selective layer can be used to form films or membranes by any convenient technique known in the art, and may take diverse forms. Because the polymers are glassy and rigid, an unsupported film, tube or fiber of the polymer may be usable in principle as a single-layer membrane. In this case, our preferred method of manufacture is to prepare a solution of the polymer in a perfluorinated solvent and to cast the solution onto a glass plate or a removable or non-removable backing web, according to general casting procedures that are well known in the art. The resulting flat-sheet membrane films may be dried under ambient conditions, at elevated temperature, or under vacuum as desired to produce thin film membranes.

Alternatively, the membrane may be manufactured in the form of hollow fibers, the general methods for preparation of which are copiously described in the literature, for example in U.S. Pat. No. 3,798,185 to Skiens et al., incorporated herein by reference.

However, such single-layer films will normally be too thick to yield acceptable transmembrane flux, and in practice, the separation membrane usually comprises a very thin selective layer that forms part of a thicker structure, such as an integral asymmetric membrane, comprising a dense region that forms the separation membrane and a microporous support region. Such membranes were originally developed by Loeb and Sourirajan, and their preparation in flat sheet or hollow fiber form is now conventional in the art and is described, for example, in U.S. Pat. No. 3,133,132 to Loeb, and U.S. Pat. No. 4,230,463 to Henis and Tripodi.

As a further, and a preferred, alternative, the membrane may be a composite membrane, that is, a membrane having multiple discrete layers. Modern composite membranes typically comprise a highly permeable but relatively non-selective support membrane, preferably in the form of an asymmetric membrane, which provides mechanical strength, coated with a thin selective layer of another material that is primarily responsible for the separation properties. Typically, but not necessarily, such a composite membrane is made by solution-casting the support membrane, then solution-coating the selective layer onto the skin side of the asymmetric membrane.

General preparation techniques for making composite membranes of this type are well known, and are described, for example, in U.S. Pat. No. 4,243,701 to Riley et al., incorporated herein by reference. If the membrane is made in the form of a composite membrane, it is particularly preferred to use a fluorinated or perfluorinated polymer, such as polyvinylidene fluoride, to make the microporous support membrane. Again, the membrane may take flat-sheet, tube or hollow-fiber form. The most preferred support membranes are those with an asymmetric structure, which provides a smooth, comparatively dense surface on which to coat the selective layer. Support membranes are themselves frequently cast onto a backing web of paper or fabric. As an alternative to coating onto a support membrane, it is also possible to make a composite membrane by solution-casting the polymer directly onto a non-removable backing web, as mentioned above.

In hollow-fiber form, multilayer composite membranes may be made by a coating procedure as taught, for example, in U.S. Pat. Nos. 4,863,761; 5,242,636; and 5,156,888, or by using a double-capillary spinneret of the type taught in U.S. Pat. Nos. 5,141,642 and 5,318,417.

The membrane may also include additional layers, such as a gutter layer between the microporous support membrane and the selective layer, or a sealing layer on top of the selective layer. A gutter layer generally has two purposes. The first is to coat the support with a material that seals small defects in the support surface, and itself provides a smooth, essentially defect-free surface onto which the selective layer may be coated. The second is to provide a layer of highly permeable material that can channel permeating molecules to the relatively widely spaced pores in the support layer.

Preferred materials for the gutter layer are fluorinated or perfluorinated, to maintain high chemical resistance through the membrane structure, and of very high permeability. Particularly preferred for the gutter layer, although they are unsuitable for the selective layer, are the perfluorinated dioxole polymers and copolymers of U.S. Pat. No. 5,051,114 referred to above, having fractional free volume greater than 0.3 and extraordinarily high permeability, such as copolymers of perfluoro-2,2-dimethyl-1,3dioxole and tetrafluoroethylene, available commercially as Teflon® AF from DuPont Fluoroproducts of Wilmington, Del. Such materials, or any others of good chemical resistance that provide protection for the selective layer without contributing significant resistance to gas transport, are also suitable as sealing layers.

Multiple selective layers may also be used. In particular, depending on the properties of the material used for the asymmetric support membrane and the porosity of the skin, the skin layer of the support may also act as a selective layer to provide a contribution to the overall selectivity of the composite.

The thickness of the selective layer or skin of the membranes can be chosen according to the proposed use, but will generally be no thicker than 10 $\mu$m, and typically no thicker than 5 $\mu$m. It is preferred that the selective layer be sufficiently thin that the membrane provide a pressure-normalized nitrogen flux, as measured with pure nitrogen gas at 25° C., of at least about 10 GPU, more preferably at least about 25 GPU and most preferably at least about 50 GPU. As mentioned above, the membranes of the invention generally provide transmembrane gas fluxes that are high compared with membranes using conventional nitrogen-separating materials, such as polyimides, cellulose acetate and polysulfone.

Once formed, the membranes exhibit a combination of good mechanical properties, thermal stability, and high chemical resistance. The fluorocarbon polymers that form the selective layer are typically insoluble except in perfluorinated solvents and are resistant to acids, alkalis, oils, low-molecular-weight esters, ethers and ketones, aliphatic and aromatic hydrocarbons, halogenated compounds and oxidizing agents, making them suitable for use not only in the presence of $C_{3+}$ hydrocarbons, but in many other hostile environments.

The membranes to the invention may be prepared in any known membrane form and housed in any convenient type of housing and separation unit. We prefer to prepare the membranes in flat-sheet form and to house them in spiral-wound modules. However, flat-sheet membranes may also be mounted in plate-and-frame modules or in any other way. If the membranes are prepared in the form of hollow fibers or tubes, they may be potted in cylindrical housings or otherwise.

The membrane separation unit, 2, comprises one or more membrane modules. The number of membrane modules required will vary according to the volume of gas to be treated, the composition of the feed gas, the desired compositions of the permeate and residue streams, the operating pressure of the system, and the available membrane area per module. Systems may contain as few as one membrane module or as many as several hundred or more. The modules may be housed individually in pressure vessels or multiple elements may be mounted together in a sealed housing of appropriate diameter and length.

The composition and pressure at which the feed stream, 1, is supplied to the membrane modules varies depending on the source of the stream. If the feed gas stream to be treated is at high pressure compared with atmospheric, such as 200 psia, 400 psia, 500 psia or above, the separation may be effected simply by making use of this high pressure to provide an adequate driving force and feed:permeate pressure ratio. Otherwise, a pressure difference can be provided by compressing the feed stream, by drawing a vacuum on the permeate side of the membrane, or a combination of both. Polymer membranes can typically withstand pressure differences between the feed and permeate side up to about 1,500–2000 psi, so it might occasionally be necessary to let down the gas pressure before it can be fed to the membrane system.

An important consideration is the effect of hydrocarbons, particularly $C_{3+}$ hydrocarbons, in the feed stream. Unlike prior art membranes, the membranes of the invention can maintain useful gas/hydrocarbon separation performance, in terms of transmembrane gas flux and selectivity, when exposed to high concentrations of such organics, even when the gas mixture is close to saturation with these compounds. This is true with respect to a broad range of hydrocarbons, including paraffins, olefins, aromatics, such as benzene, toluene and xylenes (BTEX), alcohols and chlorinated compounds. These properties are different from those reported in the literature for dioxole membranes, as well as obtained with prior art conventional membrane materials, such as cellulose acetate, polysulfone, or polyimides that are not perfluorinated.

Even if condensation of organic liquid does accidentally occur from time to time, the membrane unit can generally be purged with, for example, an inert gas such as nitrogen, and the membranes will frequently continue thereafter to exhibit adequate nitrogen/hydrocarbon selectivity properties.

In contrast, prior art membranes in commercial use are generally plasticized and irreversibly damaged by exposure to $C_{3+}$ hydrocarbon vapors at any significant concentration, such as more than about 10%, 20% or 25%, or at more modest concentrations, such as less than 10%, for prolonged periods, and cannot withstand even fleeting exposure to condensed hydrocarbon liquids.

The ability of the membranes to withstand exposure to organic compounds means that the membrane modules may be cleaned with organic solvents. This is a very useful property. Industrial gas streams often contain small amounts of entrained oils and other relatively heavy organic components, which may enter the separation system and become trapped in the modules, fouling the membrane surface. Even if the membranes themselves are not damaged, the performance may be adversely affected by the build-up of such materials. One attractive feature of the present invention is that the modules can be cleaned periodically or as required by flushing with organic solvents to remove such contaminants.

As a rough general guide, expressed as a concentration, the feed gas treated by the process of the invention may have a hydrocarbons content, including $C_{3+}$ hydrocarbon vapors, of at least about 5%, 10%, 15%, 20% or higher. Expressed in terms of partial pressure, the feed stream may often be acceptable with a partial pressure of $C_{3+}$ hydrocarbons of as high as 15 psia, 25 psia, 50 psia, 100 psia or more, assuming a gas temperature of ambient or above; and the residue stream partial pressure of the $C_{3+}$ hydrocarbons together can often be as high as 50 psia, 100 psia, 150 psia or 200 psia, again assuming a temperature of ambient or above. Expressed as the ratio of the feed pressure, P, to the saturation vapor pressure, $P_{sat}$, of the gas mixture, which is an approximate measure of the activity of the gas, the feed gas may be supplied to the membrane separation step at pressure and temperature conditions that result in the percentage $P/P_{sat}$ being at least about 25%, 30%, 50%, 60%, 70% or higher.

Methane and $C_2$ components, which tend to have low boiling points, and to be less condensable and less harmful in terms of their plasticizing ability, can generally be present in any concentration.

As mentioned above, the membranes are also very resistant to plasticization by carbon dioxide, even at high carbon dioxide partial pressures. Thus, the feed stream does not necessarily have to be pretreated to remove carbon dioxide, and the partial pressure of carbon dioxide in the feed can be as high as 50 psia, 100 psia, 150 psia, 200 psia or above.

Since the materials used for the selective layer of the membrane are glassy under the conditions of use, the membrane selectivity tends to increase as the temperature declines. Therefore, if a higher selectivity than can be obtained at ambient temperature is required, the feed stream may optionally be cooled before entering the membrane separation unit.

In particular, for the separation of nitrogen from methane, such as in natural gas processing, it is preferred to operate at sub-ambient temperature. This may conveniently be done by running the residue or permeate streams, or both, in heat exchanging relationship against the incoming feed stream, as illustrated in the Examples section below.

Depending on the performance characteristics to the membrane, and the operating parameters of the system, the process can be designed for varying levels of gas purification and recovery. Single-stage gas-separation processes typically remove up to about 80–95% of the preferentially permeating component from the feed stream and produce a permeate stream significantly more concentrated in that component than the feed gas. This degree of separation is adequate for many applications. If the residue stream requires further purification, it may be passed to a second bank of modules for a second processing step. If the permeate stream requires further concentration, it may be passed to a second bank of modules for a second-stage treatment. Such multistage or multistep processes, and variants thereof, will be familiar to those of skill in the art, who will appreciate that the process may be configured in many possible ways, including single-stage, multistage, multistep, or more complicated arrays of two or more units in series or cascade arrangements.

Optionally, the processes of the invention already discussed may include other separation steps used in conjunction with the defined membrane separation process. Examples of such separation steps include adsorption, absorption, other types of membrane separation, condensation, and distillation. The other separation steps may be carried out upstream, downstream or both of the membrane separation step, that is, with reference to FIG. 1 on any of streams 1, 4 and 5. As non-limiting examples, streams may be filtered to separate out entrained oil or water droplets, passed through a glycol absorption unit for dehydration, subjected to amine scrubbing to remove hydrogen sulfide, or cooled to condense out high boiling components.

As just one more specific illustration, processes that include the membrane separation step combined with a pressure swing adsorption (PSA) step are within the scope to the invention. Details of the operation of PSA units are well documented in the art, and do not require lengthy description here. It is also well known to combine PSA with membrane separation, as is disclosed, for example, in U.S. Pat. No. 6,011,192.

The invention is now illustrated in further detail by specific examples. These examples are intended to further clarify the invention, and are not intended to limit the scope in any way.

EXAMPLES

Example 1

Membrane Making

Asymmetric, microporous poly(vinylidene fluoride) [PVDF] support membranes were prepared. Composite membranes were prepared using the following coating solutions:

1 wt % copolymer solution of 40% tetrafluoroethylene/ 60% 2,2,4-trifluoro-5-trifluoromethoxy-1,3-dioxole (Hyflon® AD60), (Ausimont, Italy), in a perfluorinated solvent (Fluorinert FC-84), (3M, St. Paul, Minn.).

1 wt % copolymer solution of 20% tetrafluoroethylene/ 80% 2,2,4-trifluoro-5-trifluoromethoxy-1,3-dioxole (Hyflon® AD80), (Ausimont, Italy), in FC-84 solvent.

1 wt % polyperfluoro (alkenyl vinyl ether) (Cytop®), (Asahi Glass, Japan), in FC-84 solvent.

The support membranes were dip-coated in a solution of one of the three selective polymer solutions at 1 ft/min coating speed, then dried in an oven at 60° C. for 10 minutes. The resulting membranes had a selective layer thickness ranging from 0.2–0.5 μm.

Samples of each finished composite membrane were cut into 12.6 cm² stamps and tested in a permeation test-cell apparatus with pure gases at 35° C. feed temperature and 65 psia feed pressure. During each test, the feed, permeate, and residue compositions were analyzed by gas chromatography (GC).

The gas fluxes to the membranes were measured, and the selectivities were calculated. Table 1 summarizes the fluxes and Table 2 summarizes the selectivities of the composite membranes, calculated as the ratio of the pure gas fluxes.

TABLE 1

| | Pure-Gas Pressure-Normalized Flux (GPU) | | |
|---|---|---|---|
| Gas | Hyflon ® AD60 | Hyflon ® AD80 | Cytop ® |
| Nitrogen | 52 | 184 | 34 |
| Oxygen | 180 | 574 | 130 |
| Helium | 1,360 | 1,850 | 1,270 |
| Hydrogen | 790 | 2,040 | 620 |
| Argon | 85.4 | 289 | 56 |
| Carbon Dioxide | 433 | — | 300 |
| Methane | 17.6 | 65.8 | 11 |
| Ethane | 4.5 | 18.8 | 3 |
| Ethylene | 9.8 | 35.9 | 5.7 |
| Propane | 1.1 | — | 3.4 |
| Propylene | 5.1 | 25.6 | — |
| $CF_4$ | 0.94 | 3.38 | 0.48 |
| $NF_3$ | 10.3 | 38.8 | 5.7 |

1 GPU = 1 × 10⁻⁶ cm³(STP)/cm² · s · cmHg

TABLE 2

| | Selectivity (-) | | |
|---|---|---|---|
| Gas Pair | Hyflon ® AD60 | Hyflon ® AD80 | Cytop ® |
| $N_2/CF_4$ | 55 | 58 | 71 |
| $O_2/N_2$ | 3.5 | 3.1 | 3.8 |
| $N_2/CH_4$ | 2.9 | 2.8 | 3.2 |
| $He/H_2$ | 1.7 | 0.91 | 2.0 |
| $Ar/CH_4$ | 4.8 | 4.4 | 5.3 |
| $Ar/C_2H_4$ | 8.7 | 8.0 | 9.7 |
| $CO_2/CH_4$ | 26 | — | 28 |
| $H_2/CH_4$ | 45 | 31 | 59 |
| $N_2/C_2H_4$ | 5.3 | 5.1 | 6.0 |
| $N_2/C_2H_6$ | 10 | 7.2 | — |

Example 2
Mixed-Gas Nitrogen/Ethylene Permeation Properties

Membranes were prepared and membrane stamps were subjected to permeation experiments using the same general procedure as in Example 1. The temperature was 23° C., the feed pressure was 165 psia, and the feed gas mixture contained 80% nitrogen and 20% ethylene. The pressure-normalized fluxes of nitrogen and ethylene were measured, and the nitrogen/ethylene selectivities were calculated. The results are shown in Table 3.

TABLE 3

| Membrane | Mixed-Gas Pressure-Normalized Flux (GPU) | | $N_2/C_2H_4$ Selectivity (−) |
|---|---|---|---|
| | $N_2$ | $C_2H_4$ | |
| Hyflon ® AD60 | 53 | 11 | 4.8 |
| Hyflon ® AD80 | 184 | 41.8 | 4.4 |
| Cytop ® | 31 | 5.3 | 5.8 |

Example 3
Solvent Resistance of Hyflon® AD60 compared to Polysulfone

Experiments were carried out to determine the stability of a Hyflon® AD60 membrane in the presence of hydrocarbon solvents. Samples of a Hyflon® AD60 membrane were tested in a permeation test-cell as in Example 1. The fluxes were measured and the selectivities calculated. The membrane stamps were then immersed in liquid toluene or hexane. After one week, the membranes were removed from the hydrocarbon liquid, dried at ambient temperature, and retested in the gas permeation test-cell. A polysulfone (PSF) asymmetric membrane, typically used in hydrogen separation processes, was also tested for comparison. The permeation properties of the Hyflon® AD60 and polysulfone membranes before and after exposure to the hydrocarbon solvent are summarized in Table 4.

TABLE 4

| Membrane | Initial Flux (GPU) | | Initial Selectivity (−) | | Post-Toluene Flux (GPU) | | Post-Toluene Selectivity (−) | |
|---|---|---|---|---|---|---|---|---|
| | $N_2$ | $H_2$ | $N_2/CH_4$ | $H_2/CH_4$ | $N_2$ | $H_2$ | $N_2/CH_4$ | $H_2/CH_4$ |
| Hyflon ® | 30 | 350 | 2.1 | 25 | 41 | 477 | 2.2 | 26 |
| PSF | 1.2 | — | — | — | Dissolved | | | |

| Membrane | Initial Flux (GPU) | | Initial Selectivity (−) | | Post-Hexane Flux (GPU) | | Post-Hexane Selectivity (−) | |
|---|---|---|---|---|---|---|---|---|
| | $N_2$ | $H_2$ | $N_2/CH_4$ | $H_2/CH_4$ | $N_2$ | $H_2$ | $N_2/CH_4$ | $H_2/CH_4$ |
| Hyflon ® | 31 | 350 | 2.1 | 24 | 41 | 480 | 2.3 | 27 |
| PSF | 0.6 | 50 | 1.2 | 99 | 1.6 | 87 | 0.9 | 48 |

As can be seen, the polysulfone membranes could not withstand exposure to toluene, and their hydrogen/methane selectivity declined by half after exposure to hexane. With respect to nitrogen/methane, the selectivity remained marginal, but tipped in favor of methane. In contrast, the dioxole copolymer Hyflon® membranes, although they exhibited higher fluxes for all gases for which they were tested after soaking in liquid hydrocarbons, retained their hydrogen/methane selectivity.

Examples 4–5
Comparative Examples with Teflon® AF 2400 Composite Membranes—Not in Accordance with the Invention

Example 4
Membrane Making

Asymmetric, microporous poly(vinylidene fluoride) [PVDF] support membranes were prepared. Composite membranes were prepared by dip-coating the support membranes three times in a solution of 1 wt % 2,2-bistrifluoromethyl-4,5-difluoro-1,3-dioxole/tetrafluoroethylene copolymer [Teflon® AF2400] solution in FC-84 solvent at 1 ft/min coating speed, then dried in an oven at 60° C. for 10 minutes. The resulting membranes had a selective layer thickness of 4 μm.

Samples of each finished composite membrane were cut into 12.6 $cm^2$ stamps and tested in a permeation test-cell apparatus with pure oxygen and nitrogen at 22° C. feed temperature and 65 psia feed pressure. During each test, the feed, permeate, and residue compositions were analyzed by gas chromatography (GC). The gas fluxes were measured, and the selectivities were calculated. Table 5 summarizes the pressure-normalized fluxes and selectivities of the composite Teflon® AF membranes.

TABLE 5

| Mixed-Gas Pressure-Normalized Flux (GPU) | | Selectivity (−) |
|---|---|---|
| $N_2$ | $O_2$ | $O_2/N_2$ |
| 185 | 353 | 1.9 |

Example 5
Mixed-Gas Nitrogen/Ethylene Permeation Properties

Membranes were prepared and subjected to permeation experiments using the same general procedure as in Example 4. The temperature was 22° C., the feed pressure was 165 psia, and the feed gas mixture was 80% nitrogen and 20% ethylene. The pressure-normalized fluxes of nitrogen and ethylene were measured, and the nitrogen/ethylene selectivities were calculated. The results are shown in Table 6.

TABLE 6

| Mixed-Gas Pressure-Normalized Flux (GPU) | | Selectivity (−) |
|---|---|---|
| $N_2$ | $C_2H_4$ | $N_2/C_2H_4$ |
| 177 | 159 | 1.1 |

The membrane was essentially unselective for nitrogen over ethylene. In contrast, Example 2 showed selectivities of about 4 to 6 for nitrogen over ethylene for the membranes of the invention.

Examples 6–8

Comparison of Pure-Gas Permeation Properties with Hyflon® AD and Teflon® AF2400 Membranes Example 6

Hyflon® AD60 Pure-Gas Permeation Properties

Hyflon® AD60 membranes were prepared as in Example 1, except using a poly(etherimide) support layer. The resulting membranes were tested as in Example 1 with pure hydrogen, nitrogen, methane, ethane, propane, and n-butane at 35° C. at feed pressures ranging from 35 to 165 psia. The n-butane was tested only at 32 psia, which is nearly 70% of the saturation vapor pressure of n-butane at 35° C. The measured pressure-normalized gas fluxes are shown graphically in FIG. 2, and the calculated nitrogen/hydrocarbon selectivities are shown graphically in FIG. 3.

Figure 2:
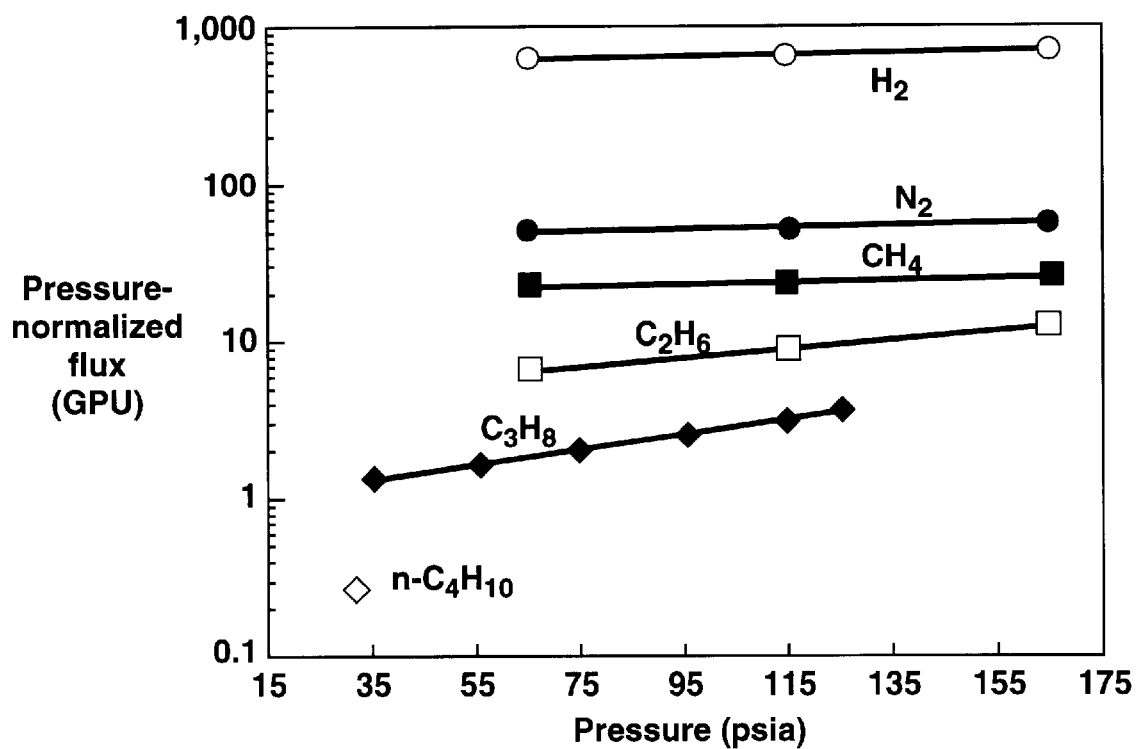
FIG. 2 is a graph of pressure-normalized pure-gas flux of hydrogen, nitrogen and several light hydrocarbons as a function of pressure for composite membranes having Hyflon® AD60 selective layers.

As can be seen in FIG. 2, the hydrogen, nitrogen, and methane fluxes remained nearly constant across the range of pressures. The ethane flux increased from 6.9 GPU at 65 psia to 12.6 GPU at 165 psia, and the propane flux increased from 1.4 GPU at 35 psia to 3.9 GPU at 125 psia, which is about 70% of the saturation vapor pressure (180 psia) of propane at 35° C.

Figure 3:
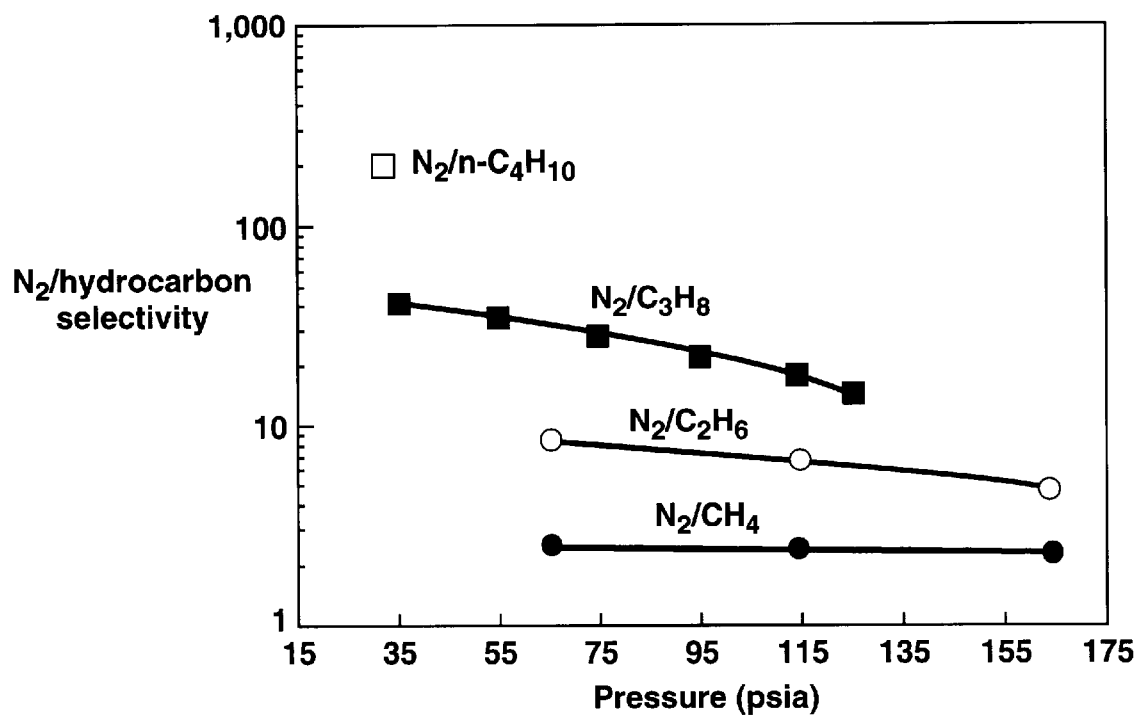
FIG. 3 is a graph of calculated nitrogen/hydrocarbon selectivity based on the pure gas data of FIG. 2.

As shown in FIG. 3, the nitrogen/methane selectivity remained constant at approximately 2.3 across the range of pressures. The nitrogen/ethane selectivity decreased from 8.2 at 65 psia to 4.5 at 165 psia, and the nitrogen/propane selectivity decreased from 42 at 35 psia to 30 at 125 psia. Although the nitrogen/propane selectivity decreased over the pressure range, the membrane remained nitrogen selective, at a useful selectivity, over the entire pressure range up to near-saturation.

Example 7

Hyflon® AD80 Pure-Gas Permeation Properties

Hyflon® AD80 membranes were prepared as in Example 1, except using a poly(etherimide) support layer. The resulting membranes were tested as in Example 1 with pure hydrogen, nitrogen, methane, ethane, propane, and n-butane at 35° C. at feed pressures ranging from 35 to 165 psia. The n-butane was tested only at 32 psia, which is nearly 70% of the saturation vapor pressure of n-butane at 35° C. The measured pressure-normalized gas fluxes are shown graphically in FIG. 4, and the calculated nitrogen/hydrocarbon selectivities are shown in FIG. 5.

Figure 4:
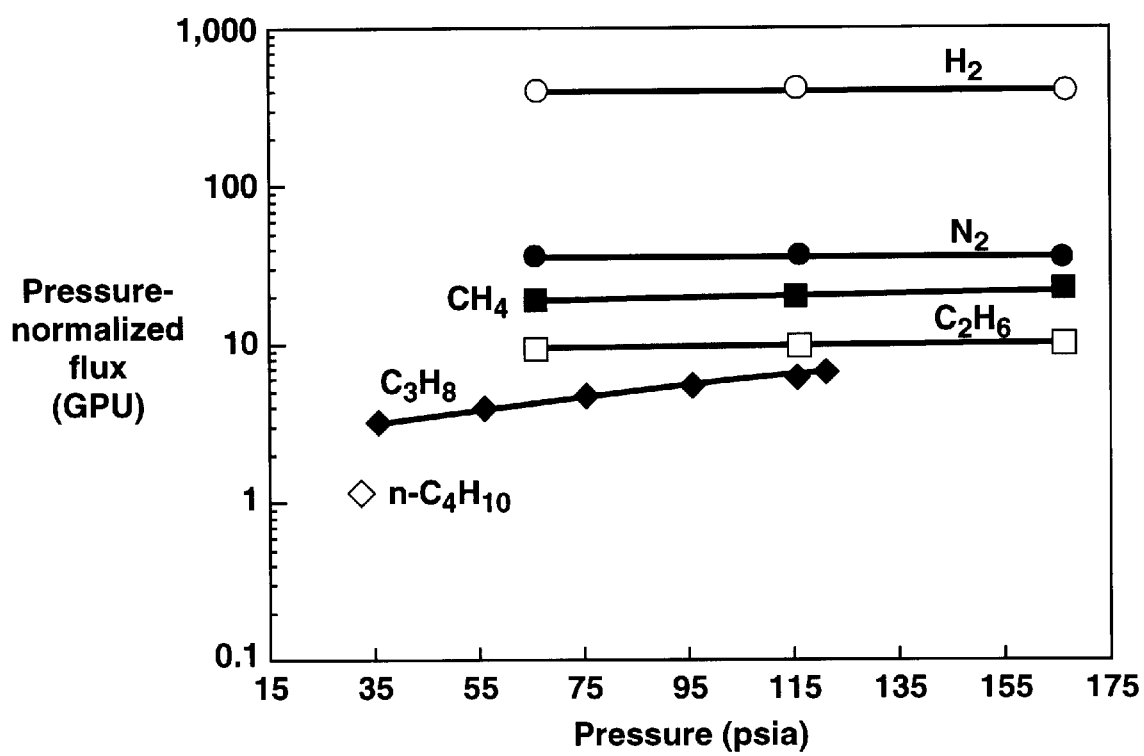
FIG. 4 is a graph of pressure-normalized pure-gas flux of hydrogen, nitrogen and several light hydrocarbons as a function of pressure for composite membranes having Hyflon® AD80 selective layers.
Figure 5:
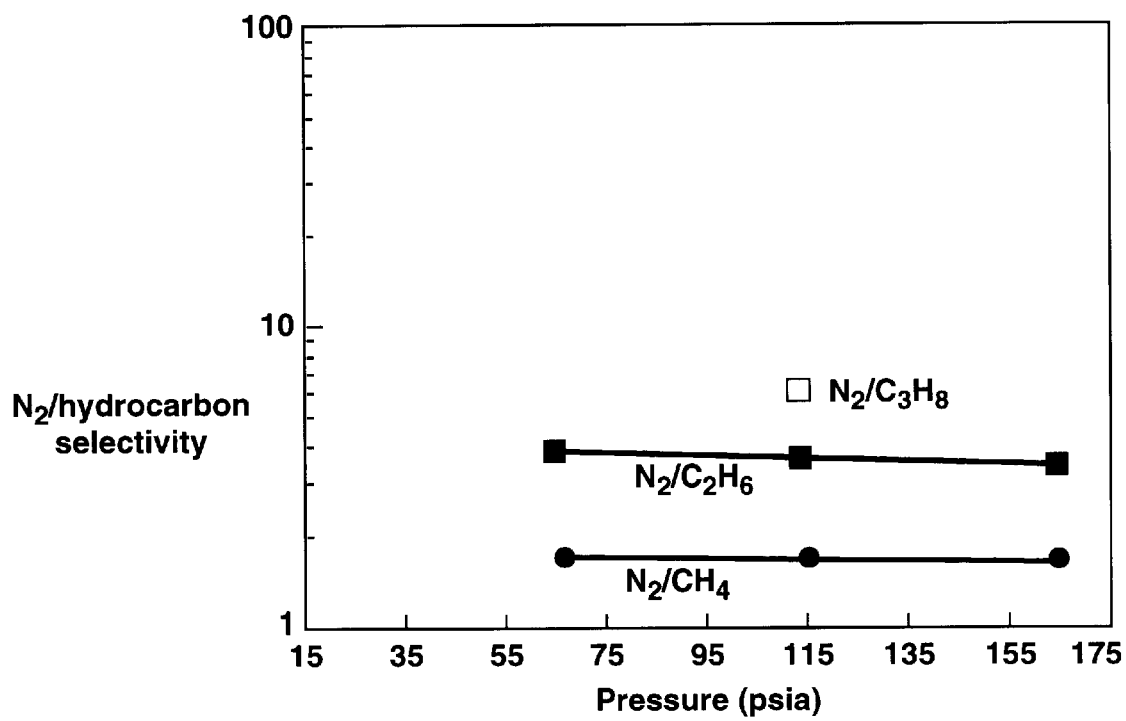
FIG. 5 is a graph of calculated nitrogen/hydrocarbon selectivity based on the pure gas data of FIG. 4.

As can be seen in FIG. 4, the hydrogen, nitrogen, methane and ethane fluxes remained nearly constant across the range of pressures. The propane flux increased from 3 GPU at 35 psia to 6.6 GPU at 120 psia. As shown in FIG. 5, the nitrogen/methane and nitrogen/ethane selectivities remained nearly constant at approximately 1.7 and 3.8, respectively, across the range of pressures. The nitrogen/propane selectivity was 5.9 at 115 psia.

Example 8

Teflon® AF2400 Pure-Gas Permeation Properties—Not in Accordance with the Invention Teflon® AF2400 membranes were prepared as in Example 4, except using a poly(etherimide) support layer. The resulting membranes were tested as in Example 4 with pure hydrogen, nitrogen, methane, ethane, propane, and n-butane at 35° C. at pressures ranging from 17 to 165 psia. The n-butane was tested only up to 31 psia, 31 psia being about 65% of the saturation vapor pressure of n-butane at 35° C. The measured pressure-normalized gas fluxes are shown graphically in FIG. 6, and the calculated nitrogen/hydrocarbon selectivities are shown graphically in FIG. 7.

Figure 6:
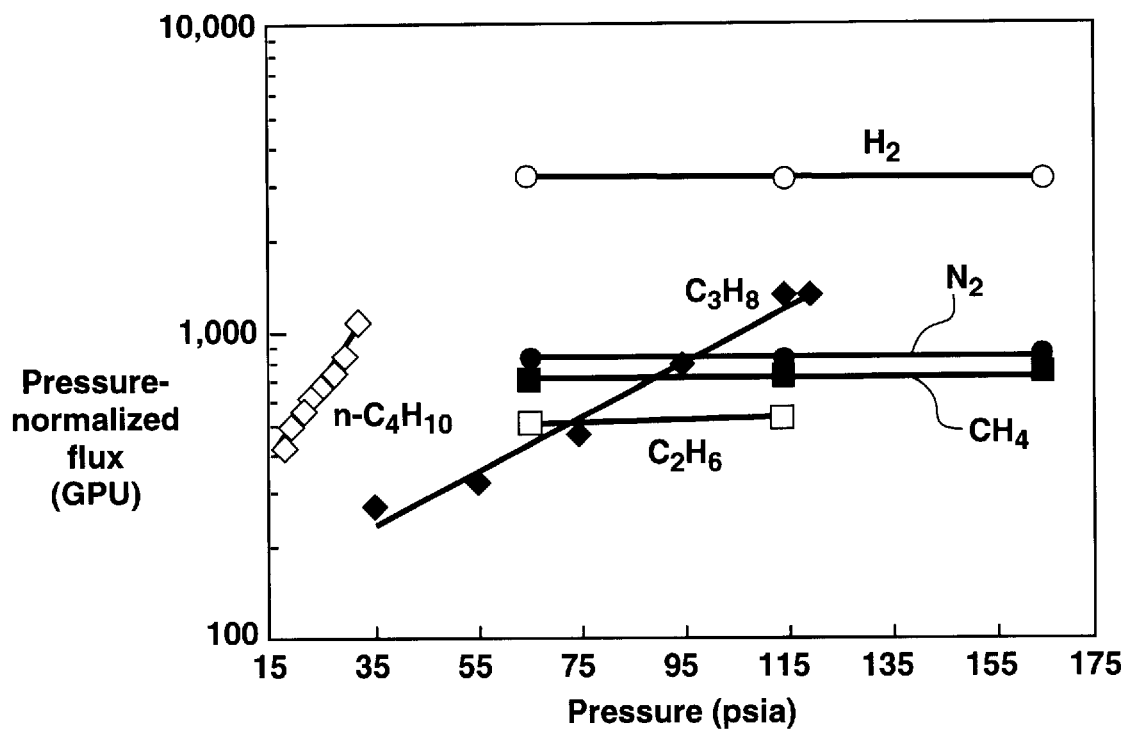
FIG. 6 is a graph of pressure-normalized pure-gas flux of hydrogen, nitrogen and several light hydrocarbons as a function of pressure for composite membranes having Teflon® AF 2400 selective layers.

As can be seen in FIG. 6, the hydrogen, nitrogen, methane, and ethane fluxes remained nearly constant across the range of pressures. The propane flux increased nearly five-fold from 268 GPU at 35 psia to 1,310 GPU at 120 psia, and the n-butane flux increased from 400 GPU at 17 psia to 1,110 GPU at 31 psia.

Figure 7:
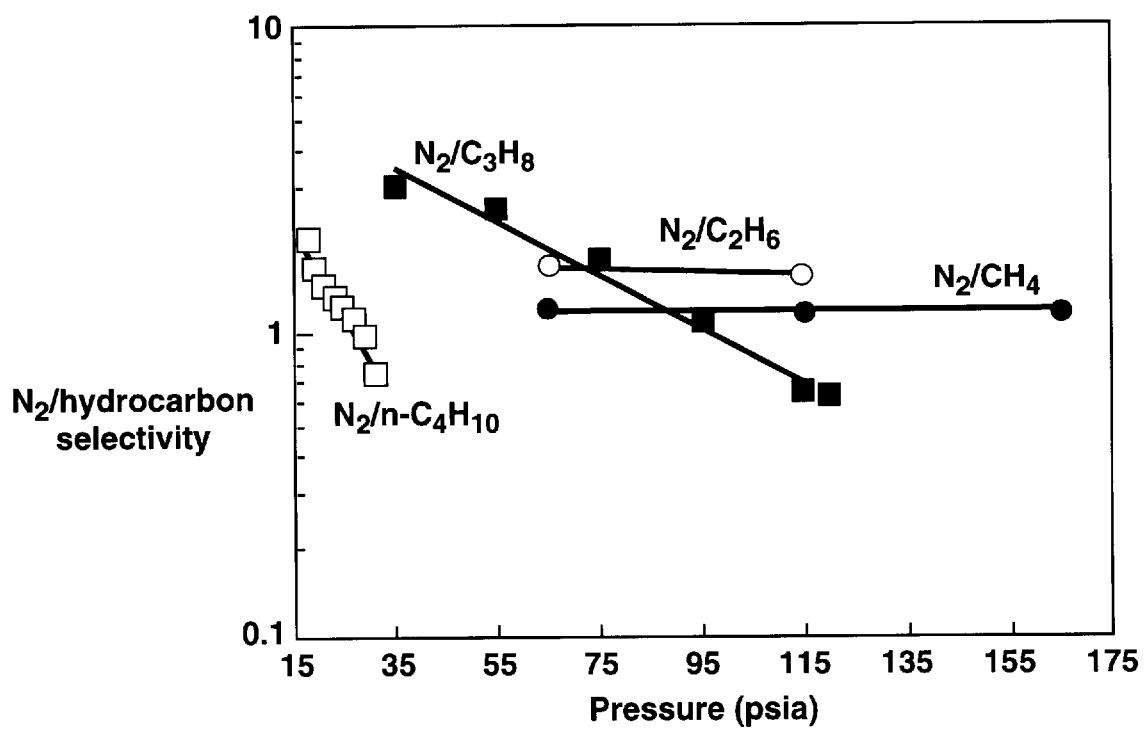
FIG. 7 is a graph of calculated nitrogen/hydrocarbon selectivity based on the pure gas data of FIG. 6.

As shown in FIG. 7, the nitrogen/methane and nitrogen/ethane selectivities were all low and remained constant at approximately 1.1 and 1.6, respectively, across the range of pressures. The nitrogen/propane selectivity decreased from 3.0 at 35 psia to 1.0 at 95 psia, about half the saturation vapor pressure of propane at 35° C., then to 0.6 at 120 psia. In other words, the membrane selectivity was initially low, and the membrane lost its nitrogen/propane selectivity completely by about 50% saturation and became hydrocarbon-selective as the pressure increased towards the propane saturation vapor pressure. Likewise, the nitrogen/n-butane selectivity decreased from 2 at 17 psia to 1 at 27 psia, then to 0.7 at 31 psia, again indicating that the membrane had become hydrocarbon-selective as the pressure increased.

Example 9

Reversal of Plasticization in Hyflon® AD60 Membranes

A Hyflon® AD60 membrane was made and a membrane stamp was tested as in Example 6 with pure gases to determine its pure-gas permeation properties. The membrane stamp was then tested with a feed gas mixture of 30% methane and 70% carbon dioxide at 20° C. at pressures ranging from 115 psia to 415 psia. The pressure-normalized gas fluxes were measured and the selectivities calculated. The carbon dioxide flux increased only slightly from 63 GPU at 115 psia to 76 GPU at 415 psia. As a result, the carbon dioxide/methane selectivity decreased only slightly from 15 at 115 psia to 12 at 415 psia.

The membrane was then tested at −20° C. over the same pressure range. At −20° C., the saturation vapor pressure of carbon dioxide is about 285 psia. The gas fluxes were measured and the selectivities calculated. This time, the carbon dioxide flux increased only slightly at the lower pressures. The flux then increased to 280 GPU at 315 psia, and then sharply to 1,430 GPU at 415 psia, indicating that the membrane had plasticized under the extreme conditions of low temperature and high pressure. As a result, the carbon dioxide/methane selectivity decreased from 36 at 115 psia to 9 at 415 psia.

After the plasticization experiments had been completed, the membrane stamp was retested with the same set of pure gases. The pure-gas permeation properties before and after the plasticization tests are shown in Table 7.

TABLE 7

| Pressure-Normalized Flux (GPU) | | | | | | | | Selectivity (−) | | | |
|---|---|---|---|---|---|---|---|---|---|---|---|
| Before Test | | | | After Test | | | | Before Test | | After Test | |
| $O_2$ | $N_2$ | $CO_2$ | $CH_4$ | $O_2$ | $N_2$ | $CO_2$ | $CH_4$ | $O_2/N_2$ | $N_2/CH_4$ | $O_2/N_2$ | $N_2/CH_4$ |
| 55.0 | 17.2 | 135 | 7.1 | 47.8 | 14.5 | 137 | 6.5 | 3.2 | 2.4 | 3.3 | 2.2 |

As can be seen, the pre- and post-plasticization-test permeation properties are essentially the same, within the limits of experimental error. The Hyflon® membranes were able to regain their original permeation properties. Thus, the plasticization did not cause irreversible damage.

Example 10
Mixed-Gas Nitrogen/Propylene Permeation Properties with Hyflon® and Cytop® Membranes Hyflon® and Cytop® membranes were prepared and membrane stamps were subjected to permeation experiments using the same general procedure as in Example 1. The temperature was 23° C., the pressure was 165 psia, and the feed gas mixture contained 90% nitrogen and 10% propylene. The saturation vapor pressure of propylene at 23° C. is about 160 psia, so the gas mixture was only about 10% saturated. The pressure-normalized fluxes of nitrogen and propylene were measured, and the nitrogen/propylene selectivities were calculated. The results are shown in Table 8.

TABLE 8

| Membrane | Mixed-Gas Pressure-Normalized Flux (GPU) | | $N_2/C_3H_6$ Selectivity (-) |
|---|---|---|---|
| | $N_2$ | $C_3H_6$ | |
| Hyflon ® AD60 | 50 | 4.5 | 11 |
| Hyflon ® AD80 | 167 | 17.8 | 9.4 |
| Cytop ® | 30 | 2.3 | 13 |

Example 11
Comparative Example of Mixed-Gas Nitrogen/Propylene Permeation Properties with Teflon® AF 2400 Membranes—Not in Accordance with the Invention Teflon® AF 2400 membranes were prepared and subjected to permeation experiments using the same general procedure as in Example 4. The temperature was 22° C., the pressure was 165 psia, and the feed gas mixture was 90% nitrogen and 10% propylene. Again, the saturation vapor pressure of propylene at 22° C. is about 160 psia, so the gas mixture was only about 10% saturated. The pressure-normalized fluxes of nitrogen and propylene were measured, and the nitrogen/propylene selectivity was calculated. The results are shown in Table 9.

TABLE 9

| Mixed-Gas Pressure-Normalized Flux (GPU) | | Selectivity (-) |
|---|---|---|
| $N_2$ | $C_3H_6$ | $N_2/C_3H_6$ |
| 151 | 176 | 0.85 |

As can be seen by comparing Examples 10 and 11, the membranes of the invention provided exceptionally high nitrogen/propylene selectivities that ranged from about 9 to 13. In contrast, the Teflon® AF 2400 membranes were essentially unselective, but slightly favored permeation of propylene over nitrogen.

Example 12

Recovery of Separation Properties in a Polyimide Membrane Module

Asymmetric, microporous poly(vinylidene fluoride) [PVDF] support membranes were prepared. Composite membranes were prepared using a coating solution of 1 wt % of the polyimide poly(3,4,3',4'-biphenyltetracarboxylic dianhydride-2,4,6-m-phenylenediamine) [BPDA-TMPD] in a hexafluoropropanol/chloroform solvent.

The support membranes were dip-coated in the BPDA-TMPD solution at 0.5 ft/mm coating speed, then dried in an oven at 100° C. for 30 minutes. The resulting membranes had a selective layer approximately 0.2 μm thick. The membranes were rolled into a spiral-wound module, which was tested in a module test apparatus with pure oxygen and nitrogen to determine the integrity of the membrane.

The BPDA-TMPD module and a BPDA-TMPD stamp were subjected to permeation experiments at 16° C. and 60° C. at 75–95 psia. The feed gas mixture was approximately 60% propylene and 40% propane. The saturation vapor pressure of the gas mixture at 16° C. is about 125 psia, and at 60° C. is about 350 psia; thus, at the highest pressure tested, 95 psia, the gas mixture was about 76% saturated at 16° C., and about 27% saturated at 60° C.

The BPDA-TMPD membrane module was then operated continuously for eight days in the module test apparatus with a 60% propylene/40% propane gas mixture at 65 psia and 30° C. At the end of this time, the module was retested with pure oxygen and nitrogen. The stamp was also retested for comparison. The gas fluxes were measured and the selectivities calculated. The results are summarized in Table 10.

TABLE 10

| | Pressure-Normalized Flux (GPU) | | | | Selectivity (-) | |
|---|---|---|---|---|---|---|
| | Before Test | | After Test | | Before Test | After Test |
| Configuration | $O_2$ | $N_2$ | $O_2$ | $N_2$ | $O_2/N_2$ | $O_2/N_2$ |
| Stamp | 22.9 | 4.3 | 5.5 | 2.0 | 5.3 | 2.8 |
| Module | 6.0 | 1.1 | 4.7 | 2.3 | 5.6 | 2.0 |

The stamp and module oxygen/nitrogen selectivities were comparable prior to the tests. After the tests, the oxygen/nitrogen selectivities decreased significantly in both configurations. The results indicate that the damage done to the polyimide membranes as a result of long-term exposure to the hydrocarbons was irreversible.

Examples 13–15
Comparison of Nitrogen/VOC Permeation Properties using Hyflon® AD60 Membranes (According to the Invention) and Polyimide Membranes (Not in Accordance with the Invention)

Example 13
Nitrogen/Dimethylethylamine Mixed-Gas Separation Properties

Hyflon® AD60 membranes were prepared as in Example 6, and membrane stamps were subjected to permeation experiments using the same general procedure as in Example 1. The temperature was 21° C., the pressure was 65 psia, and the feed gas mixture contained dimethylethylamine (DMEA) in varying concentrations from 3.2–16.6% (16.6% is saturation) and the balance nitrogen. The pressure-normalized fluxes of DMEA and nitrogen were measured, and the nitrogen/DMEA selectivities at the varying DMEA concentrations were calculated. The results are shown in Table 11.

TABLE 11

| DMEA Concentration | Mixed-Gas Pressure-Normalized Flux (GPU) | | $N_2$/DMEA Selectivity |
|---|---|---|---|
| (%) | $N_2$ | DMEA | (−) |
| 3.2 | 10.4 | 0.06 | 163 |
| 7.5 | 9.5 | 0.08 | 115 |
| 13.5 | 9.1 | 0.13 | 73 |
| 16.6 | 8.8 | 0.15 | 60 |

Figure 8:
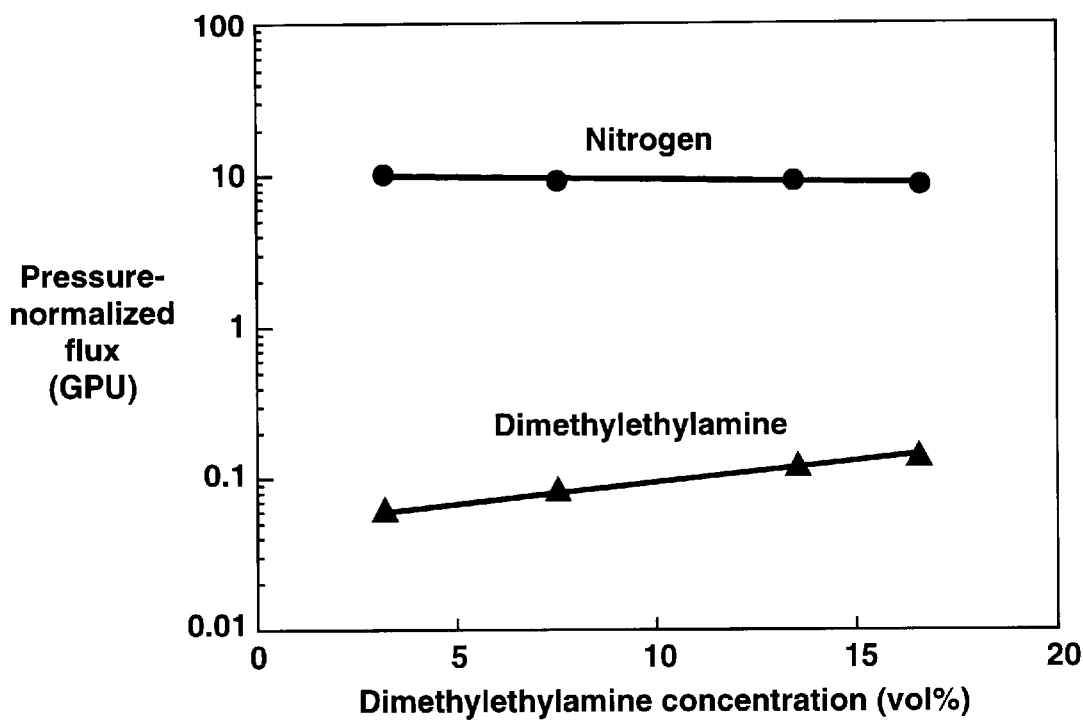
FIG. 8 is a graph of pressure-normalized mixed-gas flux of nitrogen and dimethylethylamine as a function of dimethylethylamine concentration for composite membranes having Hyflon® AD 60 selective layers.
Figure 9:
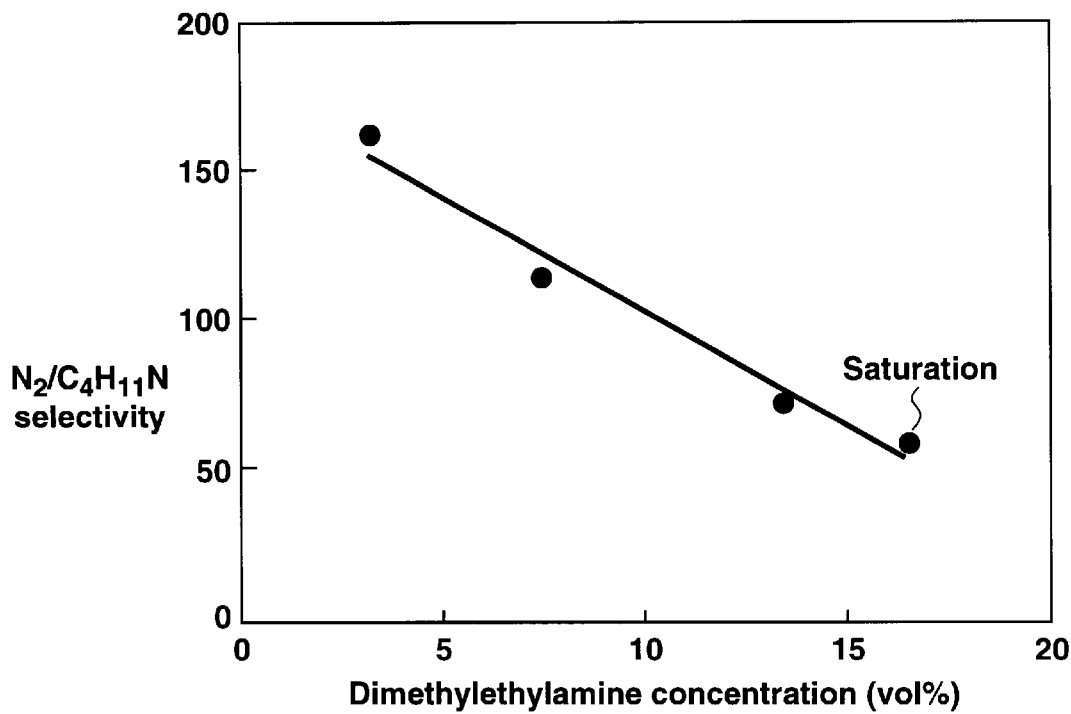
FIG. 9 is a graph of mixed-gas nitrogen/dimethylethylamine selectivity based on the mixed-gas data of FIG. 8.

FIGS. 8 and 9 are graphs showing the measured pressure-normalized fluxes and the calculated selectivities, respectively. As can be seen in FIG. 8, the nitrogen flux remained nearly constant over the range of DMEA concentrations; the DMEA flux increased as the DMEA concentration increased. As a result, the nitrogen/DMEA selectivity decreased as the DMEA concentration increased, as shown in FIG. 9. The membranes retained acceptable flux and selectivity even in the presence of DMEA at saturation.

Example 14
Nitrogen/Triethylamine Mixed-Gas Separation Properties

Hyflon® AD60 membranes were prepared as in Example 6, and membrane stamps were subjected to permeation experiments using the same general procedure as in Example 1. The temperature was 21° C., the pressure was 65 psia, and the feed gas mixture contained triethylamine (TEA) in varying concentrations from 0.7–1.9% (1.9% is saturation) and the balance nitrogen. The pressure-normalized fluxes of TEA and nitrogen were measured, and the nitrogen/TEA selectivities at the varying TEA concentrations were calculated. The results are shown in Table 12.

TABLE 12

| TEA Concentration | Mixed-Gas Pressure-Normalized Flux (GPU) | | $N_2$/TEA Selectivity |
|---|---|---|---|
| (%) | $N_2$ | TEA | (−) |
| 0.7 | 17.5 | 0.08 | 220 |
| 1.6 | 16.6 | 0.11 | 151 |
| 1.7 | 16.2 | 0.28 | 58 |
| 1.9 | 15.8 | 0.25 | 63 |

Figure 10:
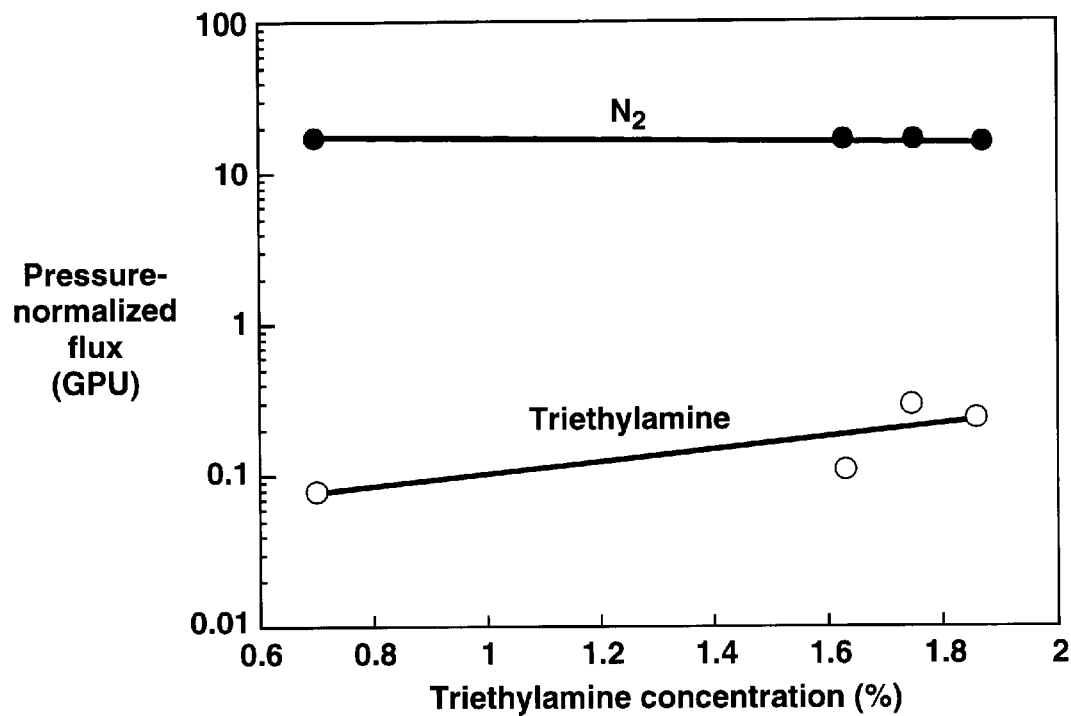
FIG. 10 is a graph of pressure-normalized mixed-gas flux of nitrogen and triethylamine as a function of triethylamine concentration for composite membranes having Hyflon® AD 60 selective layers.
Figure 11:
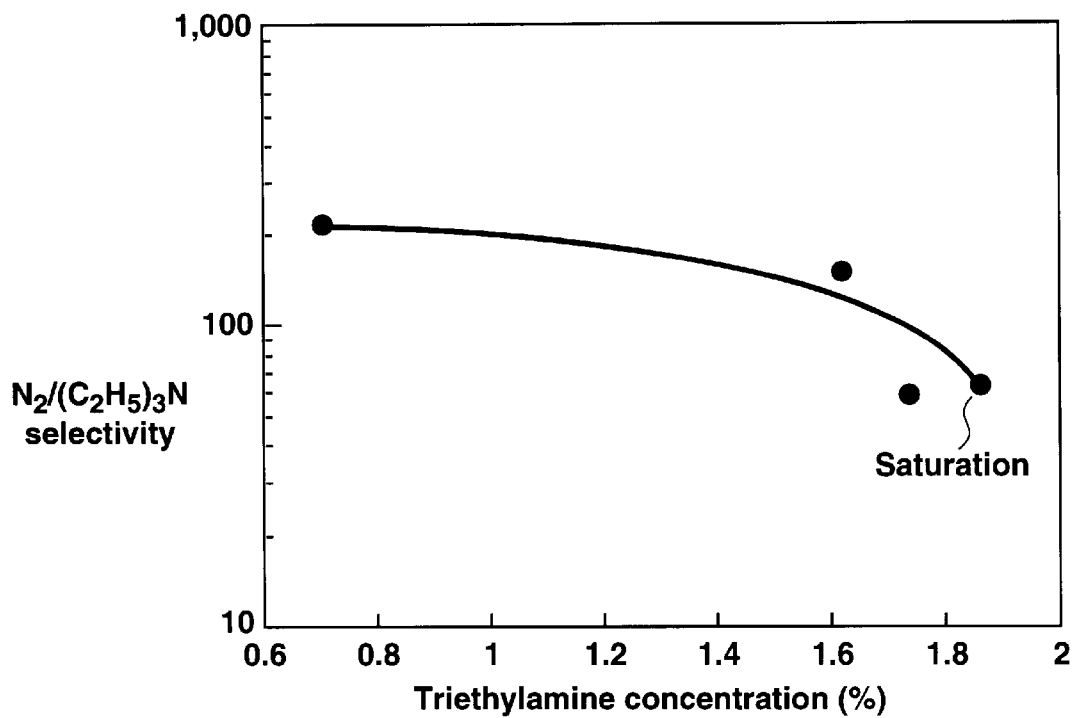
FIG. 11 is a graph of mixed-gas nitrogen/triethylamine selectivity based on the mixed-gas data of FIG. 10.

FIGS. 10 and 11 are graphs showing the measured pressure-normalized fluxes and the calculated selectivities, respectively. As can be seen in FIG. 10, the nitrogen flux remained nearly constant over the range of TEA concentrations; the TEA flux increased as the TEA concentration increased. As a result, the nitrogen/TEA selectivity decreased as the TEA concentration increased, as shown in FIG. 11. Again, the membranes retained acceptable flux and selectivity even in the presence of TEA at saturation.

Example 15
Comparative Example with Polyimide Membrane

A polyimide membrane (BPDA-TMPD) was prepared as in Example 12, and membrane stamps were subjected to permeation experiments using the same general procedure as in Example 1. The temperature was 22° C., the pressure was 65 psia, and the feed gas mixture contained 1.6% triethylamine (TEA) and 98.4% nitrogen. The pressure-normalized fluxes of TEA and nitrogen were measured, and the nitrogen/TEA selectivity was calculated. The results are shown in Table 13.

TABLE 13

| Mixed-Gas Pressure-Normalized Flux (GPU) | | $N_2$/TEA Selectivity |
|---|---|---|
| $N_2$ | TEA | (−) |
| 6.2 | 610 | 0.01 |

As can be seen, the polyimide membrane is clearly TEA-selective, in contrast to the membranes of the invention, which maintain useful nitrogen/TEA selectivities throughout the range of TEA concentrations.

Examples 16–18
Mixed Gas Experiments with Mixtures of Nitrogen, Methane and Carbon Dioxide, at Varying Temperatures and Pressures Several types of composite membranes were prepared using a PEI support membrane and a coating layer of a selective polymer, using a procedure similar to that described above.

Samples of each finished composite membrane were subjected to permeation tests with a gas mixture containing 20% nitrogen, 20% carbon dioxide and 60% methane, by cutting stamps and using the permeation test-cell apparatus as described above. The tests were carried out over a range of temperatures and feed gas pressures. The pressure on the permeate side of the cell was atmospheric in each case.

During each test, the feed, permeate, and residue compositions were analyzed by gas chromatography (GC). The pressure-normalized flux of each gas component and the selectivity for the gas pairs nitrogen/methane and carbon dioxide/methane were calculated.

Example 16
Hyflon AD60 Membranes

Membranes were prepared and tested according to the methodology above, using Hyflon AD60 as the selective layer material. Two series of experiments were conducted.

In the first series, the temperature of the permeation cell was varied from 22° C. to −20° C. The feed pressure was maintained at 200 psig in this case. The flux and selectivity results for this series are shown in Table 14.

TABLE 14

| Temperature | Mixed-Gas Pressure-Normalized Flux (GPU) | | | Selectivity | |
|---|---|---|---|---|---|
| (° C.) | $N_2$ | $CO_2$ | $CH_4$ | $N_2/CH_4$ | $CO_2/CH_4$ |
| 22 | 71 | 462 | 30 | 2.34 | 15.3 |
| 10.5 | 65 | 467 | 26 | 2.46 | 17.8 |
| 0 | 59 | 457 | 23 | 2.57 | 20.0 |
| −20 | 47 | 458 | 17 | 2.77 | 27.3 |

As can be seen, the methane flux drops significantly as the temperature drops. The nitrogen flux drops less sharply and the carbon dioxide flux remains essentially constant, resulting in an increase in both carbon dioxide/methane and nitrogen/methane selectivity. At 10° C., the membranes have a nitrogen/methane selectivity of about 2.5.

In the second series, the pressure on the feed side of the membrane was varied from 50 psig to 200 psig. In this case, the temperature was maintained at 22° C. The flux and selectivity results for this series are shown in Table 15.

TABLE 15

| Pressure | Mixed-Gas Pressure-Normalized Flux (GPU) | | | Selectivity | |
|---|---|---|---|---|---|
| (psig) | $N_2$ | $CO_2$ | $CH_4$ | $N_2/CH_4$ | $CO_2/CH_4$ |
| 50 | 70 | 407 | 30 | 2.31 | 13.5 |
| 100 | 75 | 489 | 32 | 2.34 | 15.4 |
| 150 | 72 | 472 | 31 | 2.34 | 15.3 |
| 200 | 71 | 462 | 30 | 2.34 | 15.3 |

As can be seen, the carbon dioxide flux increases with increasing feed pressure, but the fluxes of nitrogen and methane remain unchanged, indicating that the membrane is resistant to plasticization by carbon dioxide. As a result, the carbon dioxide/methane selectivity increases and the nitrogen/methane selectivity remains constant over this pressure range.

Example 17
Hyflon AD80 Membranes

The two series of experiments of Example 16 were repeated, using Hyflon AD80 as the selective layer material. The temperature series results are shown in Table 16, and the pressure series results are shown in Table 17.

TABLE 16

| Temperature | Mixed-Gas Pressure-Normalized Flux (GPU) | | | Selectivity | |
|---|---|---|---|---|---|
| (° C.) | $N_2$ | $CO_2$ | $CH_4$ | $N_2/CH_4$ | $CO_2/CH_4$ |
| 22 | 80 | 512 | 38 | 2.13 | 13.6 |
| 10.5 | 69 | 496 | 31 | 2.26 | 16.3 |
| 0 | 61 | 484 | 26 | 2.31 | 18.4 |
| −20 | 51 | 472 | 21 | 2.43 | 22.5 |

As can be seen, Hyflon AD80 is a little more permeable and a little less selective than Hyflon AD60. Cooling to 0° C. provides a nitrogen/methane selectivity of about 2.3.

TABLE 17

| Pressure | Mixed-Gas Pressure-Normalized Flux (GPU) | | | Selectivity | |
|---|---|---|---|---|---|
| (psig) | $N_2$ | $CO_2$ | $CH_4$ | $N_2/CH_4$ | $CO_2/CH_4$ |
| 50 | 76 | 421 | 34 | 2.20 | 12.2 |
| 100 | 80 | 525 | 37 | 2.17 | 14.3 |
| 150 | 80 | 514 | 37 | 2.14 | 13.8 |
| 200 | 80 | 512 | 38 | 2.13 | 13.6 |

As can be seen, the membrane again exhibits good resistance to plasticization. In this case the nitrogen/methane selectivity drops very slightly and the carbon dioxide/methane selectivity increases slightly at higher feed pressure.

Example 18
Cytop Membranes

The two series of experiments of Example 16 were repeated, using Cytop as the selective layer material. The temperature series results are shown in Table 18, and the pressure series results are shown in Table 19.

TABLE 18

| Temperature | Mixed-Gas Pressure-Normalized Flux (GPU) | | | Selectivity | |
|---|---|---|---|---|---|
| (° C.) | $N_2$ | $CO_2$ | $CH_4$ | $N_2/CH_4$ | $CO_2/CH_4$ |
| 22 | 15 | 137 | 5.7 | 2.70 | 24.2 |
| 10.5 | 12 | 123 | 4.2 | 2.80 | 29.2 |
| 0 | 8.3 | 99 | 2.8 | 3.00 | 35.8 |
| −20 | 5.3 | 79 | 1.6 | 3.40 | 50.5 |

As can be seen, Cytop is less permeable but more selective than Hyflon. Cooling to 0° C. provides a nitrogen/methane selectivity of about 3. This is a very high value for a gas mixture containing substantial quantities of carbon dioxide and at high pressure.

TABLE 19

| Pressure | Mixed-Gas Pressure-Normalized Flux (GPU) | | | Selectivity | |
|---|---|---|---|---|---|
| (psig) | $N_2$ | $CO_2$ | $CH_4$ | $N_2/CH_4$ | $CO_2/CH_4$ |
| 50 | 14 | 108 | 5.2 | 2.67 | 20.8 |
| 100 | 15 | 136 | 5.7 | 2.61 | 24.0 |
| 150 | 14 | 129 | 5.3 | 2.64 | 24.3 |
| 200 | 15 | 137 | 5.6 | 2.67 | 24.2 |

As can be seen, the membranes showed only a modest increase in carbon dioxide flux and no increase in nitrogen or methane flux as the feed pressure was increased. Thus, the selectivity for both gas pairs was constant over the pressure range.

Examples 19–21
Process Design Calculations for Nitrogen and Carbon Dioxide Removal from a Natural Gas Stream A series of computer calculations were performed with a modeling program, ChemCad V (ChemStations, Inc., Houston, Tex.), to illustrate a membrane separation process for producing a pipeline-quality gas product from a natural gas stream contaminated with nitrogen and carbon dioxide.

Example 19

Figure 12:
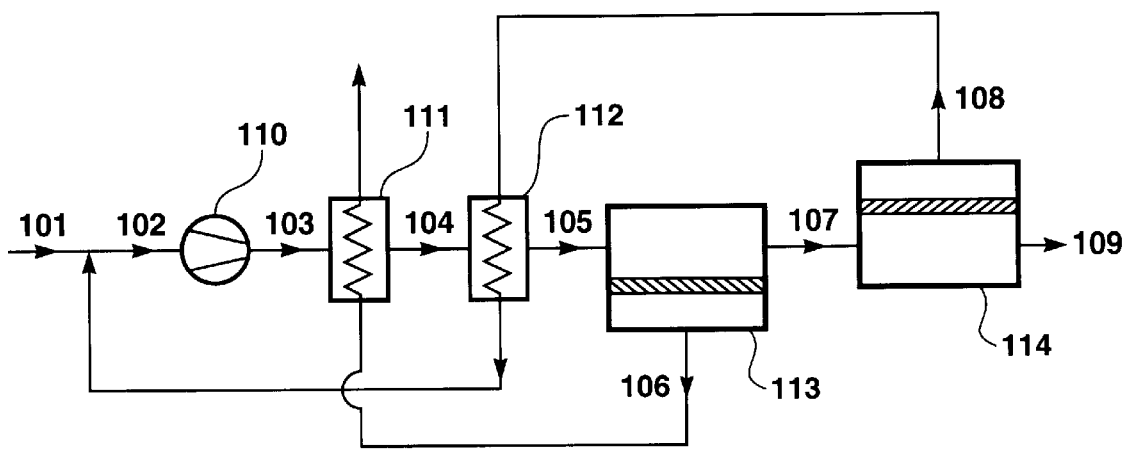
FIG. 12 is a schematic representation of an embodiment of the invention for treating nitrogen-contaminated natural gas, and having two membrane separation steps in series.

A calculation was performed assuming the process to be carried out as shown in FIG. 12, using two membrane separation steps in series. Both membrane separation steps were assumed to use a membrane providing a selectivity for nitrogen over methane of 2.5, for carbon dioxide over methane of 20, for hydrogen sulfide over methane of 20, and for water vapor over methane of 25.

Thus, raw natural gas stream, 101, is mixed with stream 108, described below, to form stream 102, and passes into compression step, 110, emerging as compressed stream, 103. The flow rate of the raw gas stream 101 was assumed to be 10 MMscfd, and the gas was assumed to contain 75% methane, 15% nitrogen, 9.9% carbon dioxide, 0.1% water vapor, and 100 ppm (parts per million) hydrogen sulfide. The raw gas was assumed to be at 200 psia and 20° C., and to be compressed to 1,200 psia in compressor 110.

After compression, stream 103 passes through first heat exchange step 111, where it is cooled by running in heat exchanging relationship against stream 106, forming partially cooled stream 104. Stream 104 passes through second heat exchange step 112, where it is cooled by running in heat exchanging relationship against second permeate stream 108, to form cooled stream 105.

Stream 105 is passed on the feed side into membrane separation step 113. The permeate side of the membranes in this step was assumed to be maintained at 200 psia. Membrane separation step 113 results in a first permeate stream, 106, that is enriched in nitrogen, carbon dioxide, hydrogen passing stream 108 in heat-exchanging relationship against stream 104, as indicated by heat exchange step 112 in FIG. 12, and thence returning it to the inlet side of compression step 110.

The results of the calculations are summarized in Table 20, where stream numbers correspond to FIG. 12.

TABLE 20

| Stream | 101 | 102 | 103 | 105 | 106 | 107 | 108 | 109 |
|---|---|---|---|---|---|---|---|---|
| Mass flow (lb/h) | 2,392 | 4,295 | 4,295 | 4,295 | 1,683 | 2,612 | 1,903 | 709 |
| Flow (MMscfd) | 10.0 | 18.9 | 18.9 | 18.9 | 6.3 | 12.6 | 8.9 | 3.7 |
| Temp. (° C.) | 20 | 18 | 25 | 9 | 3 | −3 | −16 | −28 |
| Pressure (psia) | 200 | 200 | 1,200 | 1,200 | 200 | 1,200 | 200 | 1,200 |
| Component (mol %): | | | | | | | | |
| Nitrogen | 15.0 | 15.0 | 15.0 | 15.0 | 21.4 | 11.8 | 15.0 | 4.0 |
| Methane | 75.0 | 78.7 | 78.7 | 78.7 | 62.7 | 86.7 | 82.8 | 96.0 |
| Carbon Dioxide | 9.9 | 6.2 | 6.2 | 6.2 | 15.7 | 1.5 | 2.2 | 137 ppm |
| Water | 0.1 | 0.1 | 0.1 | 0.1 | 0.2 | 15 ppm | 22 ppm | 1 ppm |
| Hydrogen Sulfide | 100 ppm | 63 ppm | 63 ppm | 63 ppm | 159 ppm | 15 ppm | 22 ppm | 0 ppm | sulfide and water vapor, but depleted in methane, compared with the membrane feed stream, 105.

Owing to cooling by Joule-Thomson expansion effects, permeate stream 106 is colder than feed stream, 105, and is passed as coolant through heat exchanger 111, then withdrawn from the process. In a real application, stream 106 could be subjected to further treatment for additional methane, nitrogen or carbon dioxide recovery, used as fuel, flared, or otherwise disposed of as desired.

First membrane separation step 113 also results in a first residue stream, 107, that is enriched in methane but depleted in nitrogen, carbon dioxide, hydrogen sulfide and water vapor, compared with the membrane feed stream 105. Since the membranes of step 113 are much more selective for carbon dioxide, hydrogen sulfide and water vapor over methane than for nitrogen over methane, most to the carbon dioxide, hydrogen sulfide and water vapor in the feed is removed in this first step.

Stream 107 is withdrawn from the residue outlet of step 113. First residue stream 107 is cooler than feed stream 105, and is passed as feed to the feed side inlet of the second membrane separation step 114 without any additional cooling. Like step 113, membrane separation step 114 contains membranes selective for nitrogen over methane, and the permeate side of the membranes was assumed to be at 200 psia.

By selectively removing nitrogen, and most of the residual carbon dioxide, hydrogen sulfide and water vapor, into second permeate stream, 108, membrane separation step 114 results in a second residue stream, 109, that is further enriched in methane. This stream is the primary product stream of the process, and is withdrawn from the process at pressure. Stream 109 meets the pipeline or other desired specifications for nitrogen, carbon dioxide, hydrogen sulfide and water vapor.

Second permeate stream, 108, is enriched in nitrogen and depleted in methane compared with the membrane feed stream, 107. Because the second membrane separation step is relied upon to bring the nitrogen concentration of the product stream down to the target value, the stage-cut needed in step 114 is quite large, so stream 108 has a high volume flow. To increase methane recovery, therefore, stream 108 is recirculated within the process as shown, by Membrane area=990 m² (360+630)
Theoretical horsepower=1,940 hp The process yielded 3.7 MMscfd of gas as second residue product stream 109, containing 4% nitrogen, 137 ppm carbon dioxide, and 1 ppm water vapor. Thus, the gas meets pipeline specification for all components. However, the methane recovery is poor, at only 47%. In a real application, the recovery could be improved by subjecting stream 106 to additional treatment, and/or by optimizing the operating parameters.

Example 20

A second calculation was performed based on the process configuration of FIG. 12. In this case, the gas was assumed to contain 64% methane, 6% nitrogen, and 30% carbon dioxide. The flow rate of the raw gas was assumed to be 10 MMscfd. The raw gas was assumed to be at 200 psia and 50° C., and to be compressed to 1,200 psia in compressor 110. The permeate side of membrane unit 113 was assumed to be maintained at 50 psia, and membrane unit 114 at 200 psia. For simplicity of the calculation, heat exchange was eliminated.

The process was assumed to be carried out using in both membrane separation steps a membrane providing a selectivity for nitrogen over methane of 2.5 and for carbon dioxide over methane of 20. The stream numbers correspond to FIG. 12. The results of the calculations are summarized in Table 21.

TABLE 21

| Stream | 101 | 102 | 105 | 106 | 107 | 108 | 109 |
|---|---|---|---|---|---|---|---|
| Flow (MMscfd) | 10.0 | 14.4 | 14.4 | 5.3 | 9.1 | 4.3 | 4.7 |
| Temp. (° C.) | 50 | 34 | 25 | 15 | 6 | −4 | −13 |
| Pressure (psia) | 200 | 200 | 1,200 | 50 | 1,200 | 200 | 1,200 |
| Component (mol %): | | | | | | | |
| Nitrogen | 6.0 | 7.4 | 7.4 | 7.8 | 7.1 | 10.5 | 3.9 |
| Methane | 64.0 | 70.6 | 70.6 | 35.4 | 91.1 | 85.9 | 96.0 |
| Carbon Dioxide | 30.0 | 22.0 | 22.0 | 56.8 | 1.8 | 3.7 | 0.1 |

Membrane area=461 m² (150+311)
Theoretical horsepower=1,541 hp

The process yielded 4.7 MMscfd of gas as second residue product stream 109, containing 3.9% nitrogen and 0.1% carbon dioxide, which meets specification for pipeline quality gas. The methane recovery is good, at 71%.

Example 21

The calculation of Example 20 was repeated, this time assuming the gas to contain 72% methane, 8% nitrogen, and 20% carbon dioxide. All other process parameters were assumed to be as in Example 20. The stream numbers correspond to FIG. 12. The results of the calculations are summarized in Table 22.

TABLE 22

| Stream | 101 | 102 | 105 | 106 | 107 | 108 | 109 |
|---|---|---|---|---|---|---|---|
| Flow (MMscfd) | 10.0 | 19.3 | 19.3 | 4.6 | 14.8 | 9.3 | 5.4 |
| Temp. (° C.) | 50 | 28 | 25 | 19 | 13 | 4 | −6 |
| Pressure (psia) | 200 | 200 | 1,200 | 50 | 1,200 | 200 | 1,200 |
| Component (mol %): | | | | | | | |
| Nitrogen | 8.0 | 10.3 | 10.3 | 12.7 | 9.6 | 12.9 | 4.0 |
| Methane | 72.0 | 77.7 | 77.7 | 43.5 | 88.3 | 83.8 | 96.0 |
| Carbon Dioxide | 20.0 | 12.0 | 12.0 | 43.7 | 2.1 | 3.3 | 462 ppm |

Membrane area=819 m$^2$ (160+659)
Theoretical horsepower=2,047 hp

The process yielded 5.4 MMscfd of gas as second residue product stream 109, containing 4% nitrogen and 462 ppm carbon dioxide, which meets pipeline specification. The methane recovery is good, at over 72%.

Examples 22–27

Effect of Membrane Selectivity on Methane Recovery

A series of calculations to demonstrate the effect of membrane nitrogen/methane selectivity on methane recovery was performed. The process configuration was assumed to be a two-step arrangement as in FIG. 12. For simplicity and since the selectivity of the membrane for other components over methane is less critical to the success of the process, other stream components were omitted. The calculations were performed to obtain a product gas containing 4% nitrogen and 96% methane in each case.

The calculations were also performed to produce a second permeate stream, 108, with the same composition, that is, 20% nitrogen, as the raw gas stream, 101, to eliminate loss of productivity caused by mixing streams of unlike composition.

Example 22

A computer calculation was performed assuming a membrane nitrogen/methane selectivity of 5 in both membrane steps. The process was assumed to be carried out as shown in FIG. 12, but, for simplicity of the calculation, without using heat integration. The flow rate of the raw gas was assumed to be 10 MMscfd, and the composition of the raw gas was assumed to be 80% methane and 20% nitrogen. The raw gas was assumed to be at 200 psia and 20° C., and to be compressed to 800 psia in compressor 110. The permeate sides of both membrane steps were assumed to be maintained at 200 psia. The stream numbers correspond to FIG. 12. The results of the calculations are summarized in Table 23.

TABLE 23

| Stream | 101 | 102 | 105 | 106 | 107 | 108 | 109 |
|---|---|---|---|---|---|---|---|
| Mass flow (lb/h) | 21,400 | 36,900 | 36,900 | 11,736 | 25,176 | 15,505 | 9,671 |
| Flow (MMscfd) | 10.0 | 17.2 | 17.2 | 5.0 | 12.3 | 7.2 | 5.0 |
| Temp. (° C.) | 20 | 18 | 25 | 23 | 21 | 15 | 9 |
| Pressure (psia) | 200 | 200 | 800 | 200 | 800 | 200 | 800 |
| Component (mol %): | | | | | | | |
| Nitrogen | 20.0 | 20.0 | 20.0 | 36.3 | 13.4 | 20.0 | 4.0 |
| Methane | 80.0 | 80.0 | 80.0 | 63.7 | 86.6 | 80.0 | 96.0 |

Membrane area=2,537 m$^2$ (930+1,607)
Theoretical horsepower=1,327 hp

The process yielded 5.0 MMscfd of gas as second residue product stream 109, containing 4% nitrogen, which meets pipeline specification. The methane recovery is 61%.

Example 23

The computer calculation of Example 22 was repeated assuming a membrane nitrogen/methane selectivity of 4 in both membrane units. All other process parameters were assumed to be as in Example 22. The stream numbers correspond to FIG. 12. The results of the calculations are summarized in Table 24.

TABLE 24

| Stream | 101 | 102 | 105 | 106 | 107 | 108 | 109 |
|---|---|---|---|---|---|---|---|
| Mass flow (lb/h) | 21,400 | 44,190 | 44,190 | 12,084 | 32,122 | 22,793 | 9,329 |
| Flow (MMscfd) | 10.0 | 20.6 | 20.6 | 5.1 | 15.5 | 10.6 | 4.9 |
| Temp. (° C.) | 20 | 17 | 25 | 23 | 22 | 15 | 8 |
| Pressure (psia) | 200 | 200 | 800 | 200 | 800 | 200 | 800 |

TABLE 24-continued

| Stream | 101 | 102 | 105 | 106 | 107 | 108 | 109 |
|---|---|---|---|---|---|---|---|
| Component (mol %): | | | | | | | |
| Nitrogen | 20.0 | 20.2 | 20.2 | 35.2 | 15.2 | 20.4 | 4.0 |
| Methane | 80.0 | 79.8 | 79.8 | 64.8 | 84.8 | 79.6 | 96.0 |

Membrane area=2,702 m² (800+1,902)
Theoretical horsepower=1,584 hp

The process yielded 4.9 MMscfd of gas as second residue product stream 109, containing 4% nitrogen, which meets pipeline specification. The methane recovery is a little lower, at 58%.

Example 24

The computer calculation of Example 22 was repeated assuming a membrane nitrogen/methane selectivity of 3 in both membrane units. All other process parameters were assumed to be as in Example 22. The stream numbers correspond to FIG. 12. The results of the calculations are summarized in Table 25.

TABLE 25

| Stream | 101 | 102 | 105 | 106 | 107 | 108 | 109 |
|---|---|---|---|---|---|---|---|
| Mass flow (lb/h) | 21,400 | 56,904 | 56,904 | 13,135 | 43,743 | 35,507 | 8,236 |
| Flow (MMscfd) | 10.0 | 26.6 | 26.6 | 5.7 | 20.9 | 16.6 | 4.3 |
| Temp. (° C.) | 20 | 17 | 25 | 24 | 22 | 15 | 8 |
| Pressure (psia) | 200 | 200 | 800 | 200 | 800 | 200 | 800 |
| Component (mol %): | | | | | | | |
| Nitrogen | 20.0 | 19.8 | 19.8 | 32.1 | 16.5 | 19.7 | 4.0 |
| Methane | 80.0 | 80.2 | 80.2 | 67.9 | 83.5 | 80.3 | 96.0 |

Membrane area=3,000 m² (710+2,290)
Theoretical horsepower=2,042 hp

The process yielded 4.3 MMscfd of gas as second residue product stream 109, containing 4% nitrogen, which meets pipeline specification. The methane recovery is 52%.

Example 25

The computer calculation of Example 22 was repeated assuming a membrane nitrogen/methane selectivity of 2.5 in both membrane units. All other process parameters were assumed to be as in Example 22. The stream numbers correspond to FIG. 12. The results of the calculations are summarized in Table 26.

TABLE 26

| Stream | 101 | 102 | 105 | 106 | 107 | 108 | 109 |
|---|---|---|---|---|---|---|---|
| Mass flow (lb/h) | 21,400 | 80,725 | 80,725 | 13,617 | 67,059 | 59,328 | 7,731 |
| Flow (MMscfd) | 10.0 | 37.7 | 37.7 | 5.9 | 31.7 | 27.7 | 4.0 |
| Temp. (° C.) | 20 | 17 | 25 | 24 | 23 | 16 | 9 |
| Pressure (psia) | 200 | 200 | 800 | 200 | 800 | 200 | 800 |
| Component (mol %): | | | | | | | |
| Nitrogen | 20.0 | 20.0 | 20.0 | 30.8 | 18.0 | 20.1 | 4.0 |
| Methane | 80.0 | 80.0 | 80.0 | 69.2 | 82.0 | 79.9 | 96.0 |

Membrane area=3,860 m² (640+3,220)
Theoretical horsepower=2,893 hp

The process yielded 4.0 MMscfd of gas as second residue product stream 109, containing 4% nitrogen, which meets pipeline specification. The methane recovery is 48%.

Example 26

The computer calculation of Example 22 was repeated assuming a membrane nitrogen/methane selectivity of 2 in both membrane units. All other process parameters were assumed to be as in Example 22. The stream numbers correspond to FIG. 12. The results of the calculations are summarized in Table 27.

TABLE 27

| Stream | 101 | 102 | 105 | 106 | 107 | 108 | 109 |
|---|---|---|---|---|---|---|---|
| Mass flow (lb/h) | 21,400 | 155,187 | 155,187 | 14,737 | 140,551 | 133,790 | 6,761 |
| Flow (MMscfd) | 10.0 | 72.5 | 72.5 | 6.5 | 66.0 | 62.5 | 3.5 |
| Temp. (° C.) | 20 | 15 | 25 | 24 | 24 | 14 | 4 |
| Pressure (psia) | 200 | 200 | 800 | 200 | 800 | 200 | 800 |
| Component (mol %): | | | | | | | |
| Nitrogen | 20.0 | 20.1 | 20.1 | 28.7 | 19.3 | 20.2 | 4.0 |
| Methane | 80.0 | 79.9 | 79.9 | 71.3 | 80.7 | 79.8 | 96.0 |

Membrane area=6,523 m² (590+5,933)
Theoretical horsepower=5,517 hp

The process yielded 3.5 MMscfd of gas as second residue product stream 109, containing 4% nitrogen, which meets pipeline specification. The methane recovery is 42%.

Example 27

The results of the calculations of Examples 22–26 are summarized in Table 28.

TABLE 28

| Parameter ▶ | $N_2/CH_4$ | Methane Recovery | Methane Recovery | Membrane Area (m²) | | Theoretical Compressor |
|---|---|---|---|---|---|---|
| Example # ▼ | Selectivity | (%) | (MMscfd) | Second-Step | Total | Horsepower |
| Example 22 | 5 | 61 | 5.0 | 1,607 | 2,537 | 1,327 |
| Example 23 | 4 | 58 | 4.9 | 1,902 | 2,702 | 1,584 |
| Example 24 | 3 | 52 | 4.3 | 2,290 | 3,000 | 2,042 |
| Example 25 | 2.5 | 48 | 4.0 | 3,220 | 3,860 | 2,893 |
| Example 26 | 2 | 42 | 3.5 | 5,933 | 6,523 | 5,517 |

This table shows the relationship between selectivity, methane recovery, membrane area required, and compression energy needs.

As can be seen, even with a relatively poor membrane selectivity of only 2 for nitrogen over methane, the process can produce a pipeline-quality product. However, as the selectivity improves, the methane recovery improves substantially, going from 42% to 60%. Likewise, as selectivity improves, the membrane area needed to perform the separation drops, as does the compression energy required. These effects are particularly pronounced as the selectivity increases from 2 to 2.5 to 3, showing the benefit of even very modest improvement in selectivity through cooling or judicious choice of membrane materials.

We claim:

1. A process for separating nitrogen from a multicomponent gas mixture comprising nitrogen, a gaseous hydrocarbon and at least one other gaseous component, the process comprising the steps of:
   (a) bringing the gas mixture into contact with the feed side of a separation membrane having a feed side and a permeate side, the separation membrane having a selective layer comprising:
      a polymer comprising repeating units having a fluorinated cyclic structure of an at least 5-member ring, the polymer having a fractional free volume no greater than about 0.3;
   (b) providing a driving force for transmembrane permeation;
   (c) withdrawing from the permeate side a permeate stream enriched in nitrogen compared to the gas mixture;
   (d) withdrawing from the feed side a residue stream depleted in nitrogen compared to the gas mixture.

2. The process of claim 1, wherein the gaseous hydrocarbon is a $C_{3+}$ hydrocarbon.

3. The process of claim 1, wherein the gaseous hydrocarbon is methane.

4. The process of claim 1, wherein the gaseous hydrocarbon is a light olefin.

5. The process of claim 1, wherein the gaseous hydrocarbon is chosen from the group consisting of halogenated compounds, amines, ketones and alcohols.

6. The process of claim 1, wherein the at least one other gaseous component is chosen from the group consisting of $C_{2+}$ hydrocarbons, argon, oxygen, carbon dioxide, hydrogen sulfide, hydrogen and water vapor.

7. The process of claim 1, wherein the gas mixture is chosen from the group consisting of natural gas, associated gas, landfill gas, a gas stream from a petrochemical operation, and an off-gas stream from a process using a volatile organic compound.

8. The process of claim 1, wherein the polymer comprises a perfluorinated polymer.

9. The process of claim 1, wherein the polymer is formed from a monomer selected from the group consisting of fluorinated dioxoles, fluorinated dioxolanes and fluorinated cyclically polymerizable alkyl ethers.

10. The process of claim 1, wherein the polymer comprises a perfluorinated polyimide.

11. The process of claim 1, wherein the repeat unit is 2,2,4-trifluoro-5-trifluoromethoxy-1,3-dioxole.

12. The process of claim 1, wherein the polymer is a polyperfluoro (alkenyl vinyl ether).

13. The process of claim 1, wherein the polymer comprises a copolymer.

14. The process of claim 1, wherein the polymer has the formula:

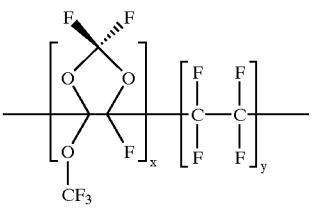

where x and y represent the relative proportions of the dioxole and the tetrafluoroethylene blocks, such that x+y=1.

15. The process of claim 1, wherein the polymer has the formula:

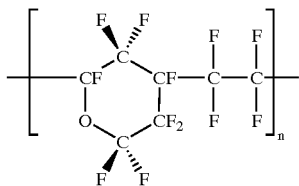

where n is a positive integer.

16. The process of claim 1, wherein the gas mixture, as brought into contact with the feed side, has a total $C_{3+}$ hydrocarbons partial pressure of at least about 25 psia.

17. The process of claim 1, wherein the gas mixture is cooled before being brought into contact with the feed side.

18. The process of claim 1, wherein the gas stream is compressed prior to step (a).

19. The process of claim 1, wherein the separation membrane exhibits a mixed-gas selectivity for nitrogen over methane as measured at the operating conditions of the process of at least about 2.

20. The process of claim 1, wherein the separation membrane provides a pressure-normalized nitrogen flux when in use in the process of at least about 50 GPU.

21. The process of claim 1, wherein the gas mixture comprises at least about 10% nitrogen.

22. The process of claim 1, wherein the gas mixture comprises no more than about 10% nitrogen.

23. The process of claim 1, further comprising passing at least one of the gas mixture, the residue stream and the permeate stream to additional separation treatment.

24. The process of claim 1, wherein the gas mixture is associated gas from a flood operation and wherein at least a portion of the permeate stream is used as a reinjection gas for the flood operation.

25. The process of claim 1, wherein at least a portion of the residue stream is passed to a natural gas pipeline.

26. The process of claim 1, wherein the gas mixture is natural gas and the residue stream contains no more than about 6% nitrogen.

27. The process of claim 1, further comprising submitting the residue stream to a second membrane separation step.

28. The process of claim 1, further comprising removing a contaminant material that has been brought into a module housing the separation membrane during operation of steps (a) through (d) by:

(e) discontinuing steps (a) through (d); and (f) flushing the module with an organic solvent.

29. A process for separating nitrogen from a multicomponent gas mixture comprising nitrogen, a gaseous hydrocarbon and at least one other gaseous component, the process comprising the steps of:

(a) bringing the gas mixture into contact with the feed side of a separation membrane having a feed side and a permeate side, the separation membrane having a selective layer comprising a polymer having:

(i) a ratio of fluorine to carbon atoms in the polymer greater than 1:1;

(ii) a fractional free volume no greater than about 0.3; and (iii) a glass transition temperature of at least about 100° C.;

and the separation membrane being characterized by a post-exposure selectivity for nitrogen over the gaseous hydrocarbon, after exposure of the separation membrane to liquid toluene and subsequent drying, that is at least about 65% of a pre-exposure selectivity for nitrogen over the gaseous hydrocarbon, as measured pre- and post-exposure with a test gas mixture of the same composition and under like conditions;

(b) providing a driving force for transmembrane permeation;

(c) withdrawing from the permeate side a permeate stream enriched in nitrogen compared to the gas mixture;

(d) withdrawing from the feed side a residue stream depleted in nitrogen compared to the gas mixture.

30. The process of claim 29, wherein the gaseous hydrocarbon is a $C_{3+}$ hydrocarbon.

31. The process of claim 29, wherein the gaseous hydrocarbon is methane.

32. The process of claim 29, wherein the gaseous hydrocarbon is a light olefin.

33. The process of claim 29, wherein the gaseous hydrocarbon is chosen from the group consisting of halogenated compounds, amines, ketones and alcohols.

34. The process of claim 29, wherein the at least one other gaseous component is chosen from the group consisting of $C_{2+}$ hydrocarbons, argon, oxygen, carbon dioxide, hydrogen sulfide, hydrogen and water vapor.

35. The process of claim 29, wherein the gas mixture is chosen from the group consisting of natural gas, associated gas, landfill gas, a gas stream from a petrochemical operation, and an off-gas stream from a process using a volatile organic compound.

36. The process of claim 29, wherein the polymer comprises a perfluorinated polymer.

37. The process of claim 29, wherein the polymer is formed from a monomer selected from the group consisting of fluorinated dioxoles, fluorinated dioxolanes and fluorinated cyclically polymerizable alkyl ethers.

38. The process of claim 29, wherein the polymer comprises a perfluorinated polyimide.

39. The process of claim 29, wherein the repeat unit is 2,2,4-trifluoro-5-trifluoromethoxy-1,3-dioxole.

40. The process of claim 29, wherein the polymer is a polyperfluoro (alkenyl vinyl ether).

41. The process of claim 29, wherein the polymer comprises a copolymer.

42. The process of claim 29, wherein the polymer has the formula:

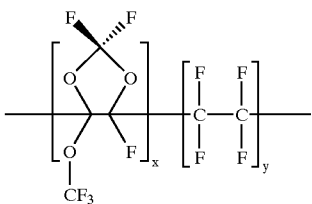

where x and y represent the relative proportions of the dioxole and the tetrafluoroethylene blocks, such that x+y=1.

43. The process of claim 29, wherein the polymer has the formula:

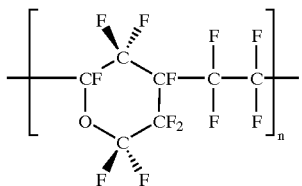

where n is a positive integer.

44. The process of claim 29, wherein the gas mixture, as brought into contact with the feed side, has a total $C_{3+}$ hydrocarbons partial pressure of at least about 25 psia.

45. The process of claim 29, wherein the gas mixture is cooled before being brought into contact with the feed side.

46. The process of claim 29, wherein the gas stream is compressed prior to step (a).

47. The process of claim 29, wherein the separation membrane exhibits a mixed-gas selectivity for nitrogen over methane as measured at the operating conditions of the process of at least about 2.

48. The process of claim 29, wherein the separation membrane provides a pressure-normalized nitrogen flux when in use in the process of at least about 50 GPU.

49. The process of claim 29, wherein the gas mixture comprises at least about 10% nitrogen.

50. The process of claim 29, wherein the gas mixture comprises no more than about 10% nitrogen.

51. The process of claim 29, further comprising passing at least one of the gas mixture, the residue stream and the permeate stream to additional separation treatment.

52. The process of claim 29, wherein the gas mixture is associated gas from a flood operation and wherein at least a portion of the permeate stream is used as a reinjection gas for the flood operation.

53. The process of claim 29, wherein at least a portion of the residue stream is passed to a natural gas pipeline.

54. The process of claim 29, wherein the gas mixture is natural gas and the residue stream contains no more than about 6% nitrogen.

55. The process of claim 29, further comprising submitting the residue stream to a second membrane separation step.

56. The process of claim 29, further comprising removing a contaminant material that has been brought into a module housing the separation membrane during operation of steps (a) through (d) by:

(e) discontinuing steps (a) through (d); and (f) flushing the module with an organic solvent.

* * * * *